US012448815B2

(12) United States Patent
Nayak et al.

(10) Patent No.: US 12,448,815 B2
(45) Date of Patent: Oct. 21, 2025

(54) BOLT ACTUATION ASSEMBLY

(71) Applicant: Schlage Lock Company LLC, Carmel, IN (US)

(72) Inventors: Rakshith R. Nayak, Mysuru (IN); Vishal Salitkumar Kusanale, Bangalore (IN); Mahesha Appaji, Bengaluru (IN); Brady Plummer, Fishers, IN (US)

(73) Assignee: Schlage Lock Company LLC, Carmel, IN (US)

( * ) Notice: Subject to any disclaimer, the term of this patent is extended or adjusted under 35 U.S.C. 154(b) by 300 days.

(21) Appl. No.: 17/580,022

(22) Filed: Jan. 20, 2022

(65) Prior Publication Data

US 2023/0228124 A1 Jul. 20, 2023

(51) Int. Cl.
*E05B 47/00* (2006.01)
*E05B 63/04* (2006.01)

(52) U.S. Cl.
CPC .......... *E05B 47/0012* (2013.01); *E05B 63/04* (2013.01); *E05B 2047/0017* (2013.01); *E05B 2047/002* (2013.01); *E05B 2047/0036* (2013.01); *E05B 2047/0067* (2013.01); *E05B 2047/0084* (2013.01)

(58) Field of Classification Search
CPC ................... E05B 63/04; E05B 63/044; E05B 2047/0017; E05B 2047/002; E05B 2047/0036; E05B 2047/0067; E05B 2047/0069; E05B 2047/0089; E05B 47/0012; E05B 2047/0084
See application file for complete search history.

(56) References Cited

U.S. PATENT DOCUMENTS 6,617,726 B1 9/2003 Tsergas
9,097,037 B2 * 8/2015 McKibben .............. E05B 47/02
(Continued)

FOREIGN PATENT DOCUMENTS

CN 110485821 A * 11/2019
EP 2450509 A2 5/2012
(Continued)

OTHER PUBLICATIONS

Machine translation of JP-2013221299-A (Year: 2013).*
(Continued)

*Primary Examiner* — Christine M Mills
*Assistant Examiner* — Peter H Watson
(74) *Attorney, Agent, or Firm* — Taft Stettinius & Hollister LLP

(57) ABSTRACT

An exemplary method includes operating an access control device including a bolt, an output gear having a magnet mounted thereon, a first magnetic sensor, and a second magnetic sensor. The method generally includes selectively determining a position of the output gear via one of the first magnetic sensor or the second magnetic sensor based upon a current handedness of the access control device. With the access control device in a first handing configuration, the first magnetic sensor may be used to a first handedness first home position of the output gear. With the access control device in a second handing configuration, the second magnetic sensor may be utilized to detect a second handedness first home position of the output gear.

17 Claims, 15 Drawing Sheets

(56) References Cited

U.S. PATENT DOCUMENTS

| | | | |
|---|---|---|---|
| 9,500,005 B2 | 11/2016 | Chen | |
| 2003/0011330 A1 | 1/2003 | Machalek et al. | |
| 2004/0099076 A1 | 5/2004 | Haskin et al. | |
| 2013/0277988 A1 | 10/2013 | Ji et al. | |
| 2015/0114055 A1* | 4/2015 | Frolov | E05B 47/0692 70/266 |
| 2015/0315816 A1 | 11/2015 | Gopalakrishnan et al. | |
| 2017/0122007 A1 | 5/2017 | Moon et al. | |
| 2019/0218824 A1 | 7/2019 | Ainley et al. | |
| 2019/0226827 A1* | 7/2019 | Caterino | E05B 47/026 |

FOREIGN PATENT DOCUMENTS

| | | |
|---|---|---|
| JP | 2013221299 A * | 10/2013 |
| WO | 2019143599 A1 | 7/2019 |

OTHER PUBLICATIONS

Machine translation of CN-110485821-A (Year: 2019).*

International Search Report; International Searching Authority; International Application No. PCT/US2023/011263; May 26, 2023; 2 pages.

Written Opinion of the International Searching Authority; International Searching Authority; International Application No. PCT/US2023/011263; May 26, 2023; 5 pages.

Examination Report No. 1; IP Australia; Australian Patent Application No. 2023209819; Jun. 24, 2025; 4 pages.

AU Examination Report No. 2; IP Australia; Australian Patent Application No. 2023209819; Jul. 3, 2025; 3 pages.

Canadian Examination Report; Canadian Intellectual Property Office; Canadian Patent Application No. 3,243,192; Jul. 17, 2025; 4 pages.

* cited by examiner

BOLT ACTUATION ASSEMBLY

TECHNICAL FIELD

The present disclosure generally relates to access control devices, and more particularly but not exclusively relates to locksets with electronic bolt retraction mechanisms.

BACKGROUND

Certain electronic locksets include an electronic actuator by which a bolt of the lockset can be extended or retracted, and a sensor for determining whether the bolt has been moved to its desired position. However, some such locksets have certain drawbacks and limitations, such as those relating to the fidelity of the sensing and/or an inability to be installed in different handing orientations. For these reasons among others, there remains a need for further improvements in this technological field.

SUMMARY

An exemplary method includes operating an access control device including a bolt, an output gear having a magnet mounted thereon, a first magnetic sensor, and a second magnetic sensor. The method generally includes selectively determining a position of the output gear via one of the first magnetic sensor or the second magnetic sensor based upon a current handedness of the access control device. With the access control device in a first handing configuration, the first magnetic sensor may be used to a first handedness first home position of the output gear. With the access control device in a second handing configuration, the second magnetic sensor may be utilized to detect a second handedness first home position of the output gear. Further embodiments, forms, features, and aspects of the present application shall become apparent from the description and figures provided herewith.

DETAILED DESCRIPTION OF ILLUSTRATIVE EMBODIMENTS

Figure 1:
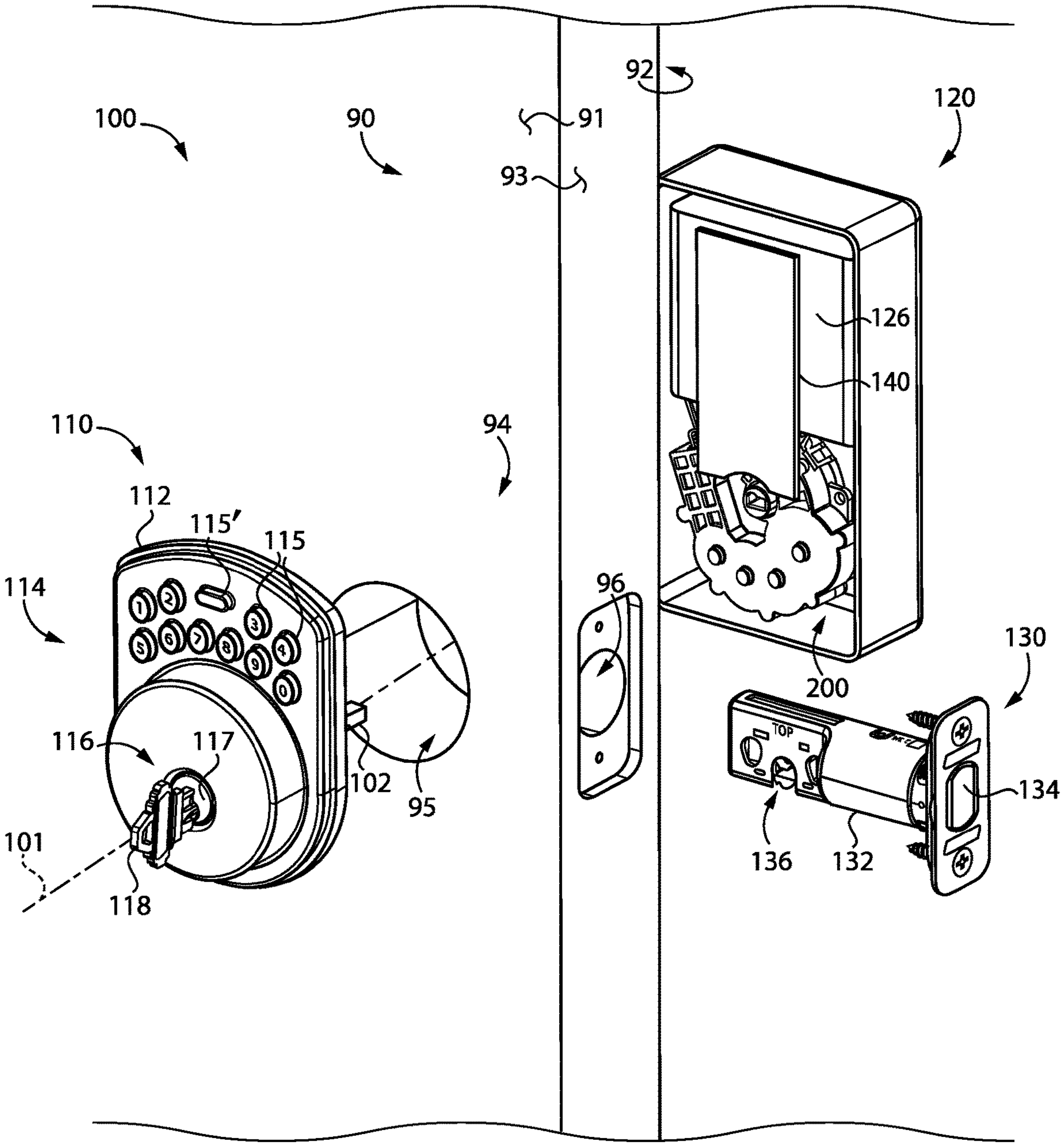
FIG. 1 is a partially-exploded assembly view of a lockset according to certain embodiments and a door.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" may be used to denote motion or spacing along three mutually perpendicular axes, wherein each of the axes defines two opposite directions. In the coordinate system illustrated in FIG. 1, the X-axis defines first and second longitudinal directions, the Y-axis defines first and second lateral directions, and the Z-axis defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. Moreover, the term "transverse" may also be used to describe motion or spacing that is non-parallel to a particular axis or direction. For example, an element that is described as being "movable in a direction transverse to the longitudinal axis" may move in a direction that is perpendicular to the longitudinal axis and/or in a direction oblique to the longitudinal axis. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is a lockset 100 according to certain embodiments installed to a door 90. The door 90 has an exterior or non-egress side 91, an interior or egress side 92, and a latch edge 93 extending between and connecting the two sides 91, 92. The door 90 also includes a door preparation 94, which generally includes a cross bore 95 extending longitudinally between the two sides 91, 92, and a latch bore 96 extending laterally between the cross bore 95 and the latch edge 93. The lockset 100 generally includes an outside trim assembly 110 mounted to the non-egress side 91, an inside trim assembly 120 mounted to the egress side 92, and a bolt mechanism 130 mounted in the latch bore 96. The lockset 100 also includes a tailpiece 102, which extends along a longitudinal axis 101 and is engaged with each of the outside trim assembly 110, the inside trim assembly 120, and the bolt mechanism 130.

Figure 3:
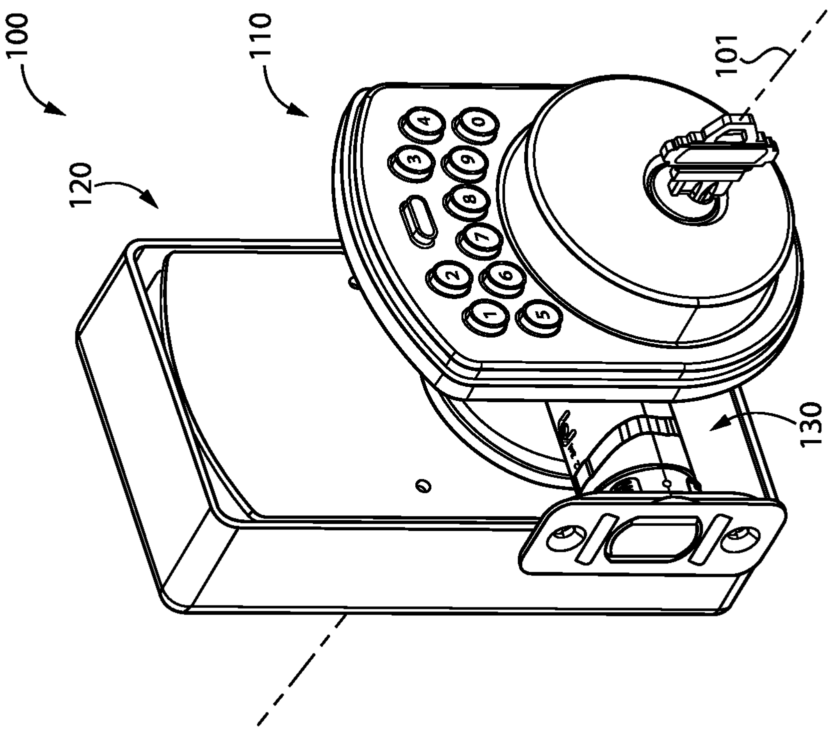
FIG. 3 is a perspective view of the lockset in a second handing configuration.
Figure 2:
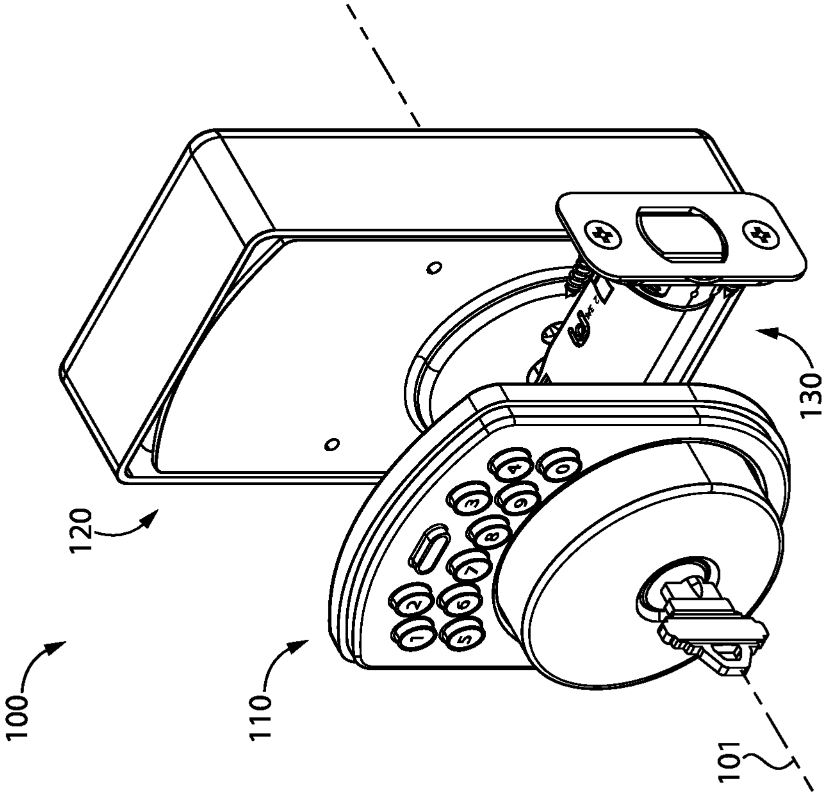
FIG. 2 is a perspective view of the lockset in a first handing configuration.

With additional reference to FIGS. 2 and 3, the lockset 100 is configurable between a first handing configuration (FIG. 2) and a second handing configuration (FIG. 3) such that the lockset 100 can be installed to both left-handed doors and right-handed doors. In the first handing configuration (FIG. 2), the bolt mechanism 130 has a first orientation relative to the longitudinal axis 101, the outside trim assembly 110, and the inside trim assembly 120. In the second handing configuration, the bolt mechanism 130 has a second orientation relative to the longitudinal axis 101, the outside trim assembly 110, and the inside trim assembly 120. As should be appreciated, the first orientation and the second orientation are different from one another, and in the illustrated form are substantially opposite one another.

Figure 4:
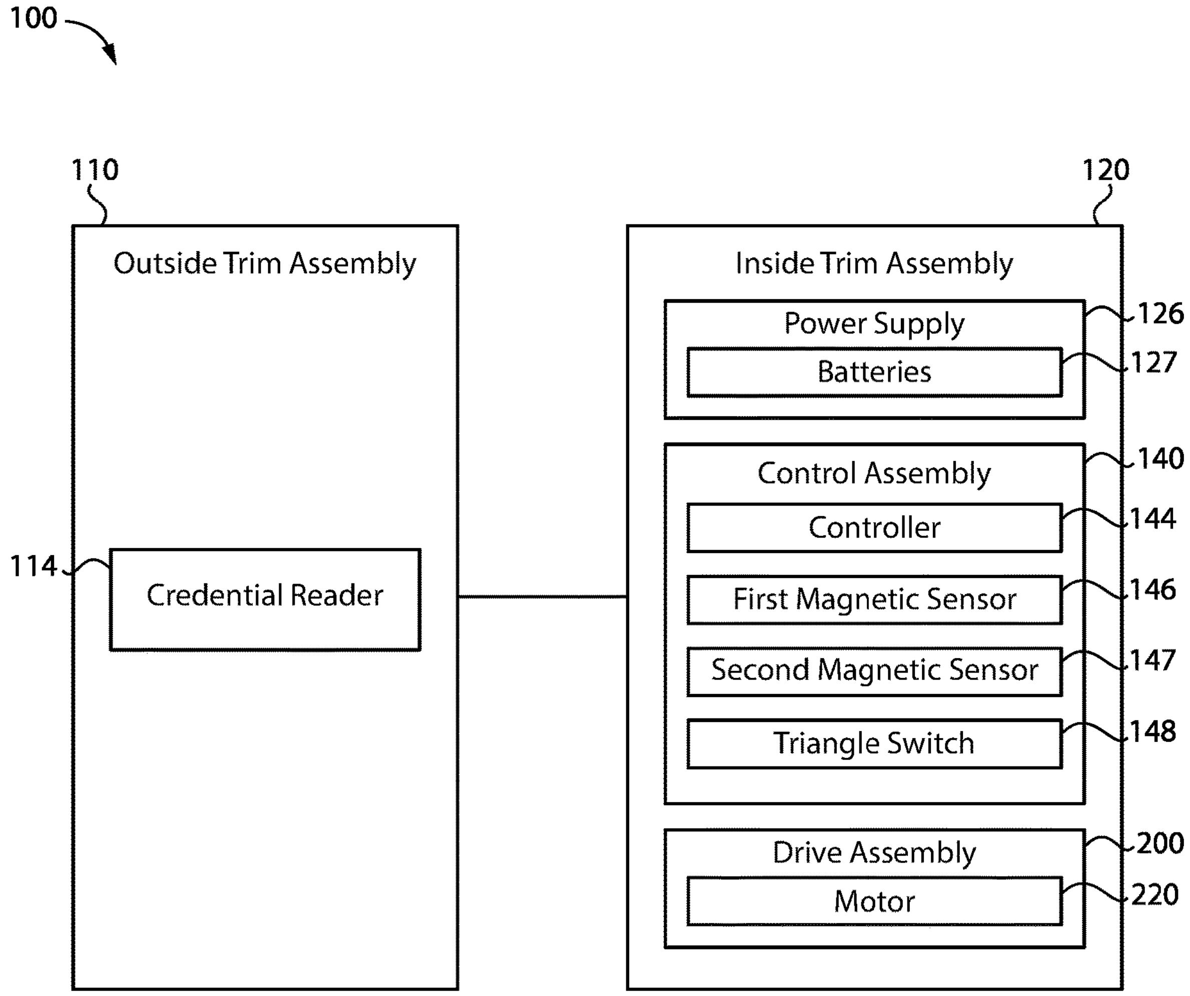
FIG. 4 is a schematic block diagram of the lockset.

With additional reference to FIG. 4, the outside trim assembly 110 generally includes an outside housing 112, a credential reader 114 mounted to the housing 112, and a lock cylinder 116 mounted to the housing 112. In the illustrated form, the credential reader 114 is provided in the form of a keypad including a plurality of keys 115. It is also contemplated that the credential reader 114 may take another form, such as one including a card reader (e.g., a proximity card reader and/or a smart card reader), a biometric reader (e.g., a fingerprint scanner and/or an iris scanner), or another form of credential reader. The lock cylinder 116 is operable by a key 118, and includes a plug 117 that is rotatable relative to the housing 112 when the proper key 118 is inserted in the plug 117. The plug 117 is connected with the tailpiece 102 via a lost rotational motion connection that permits the tailpiece 102 to rotate relative to the plug 117 by an amount sufficient to actuate the bolt mechanism 130.

Figure 5:
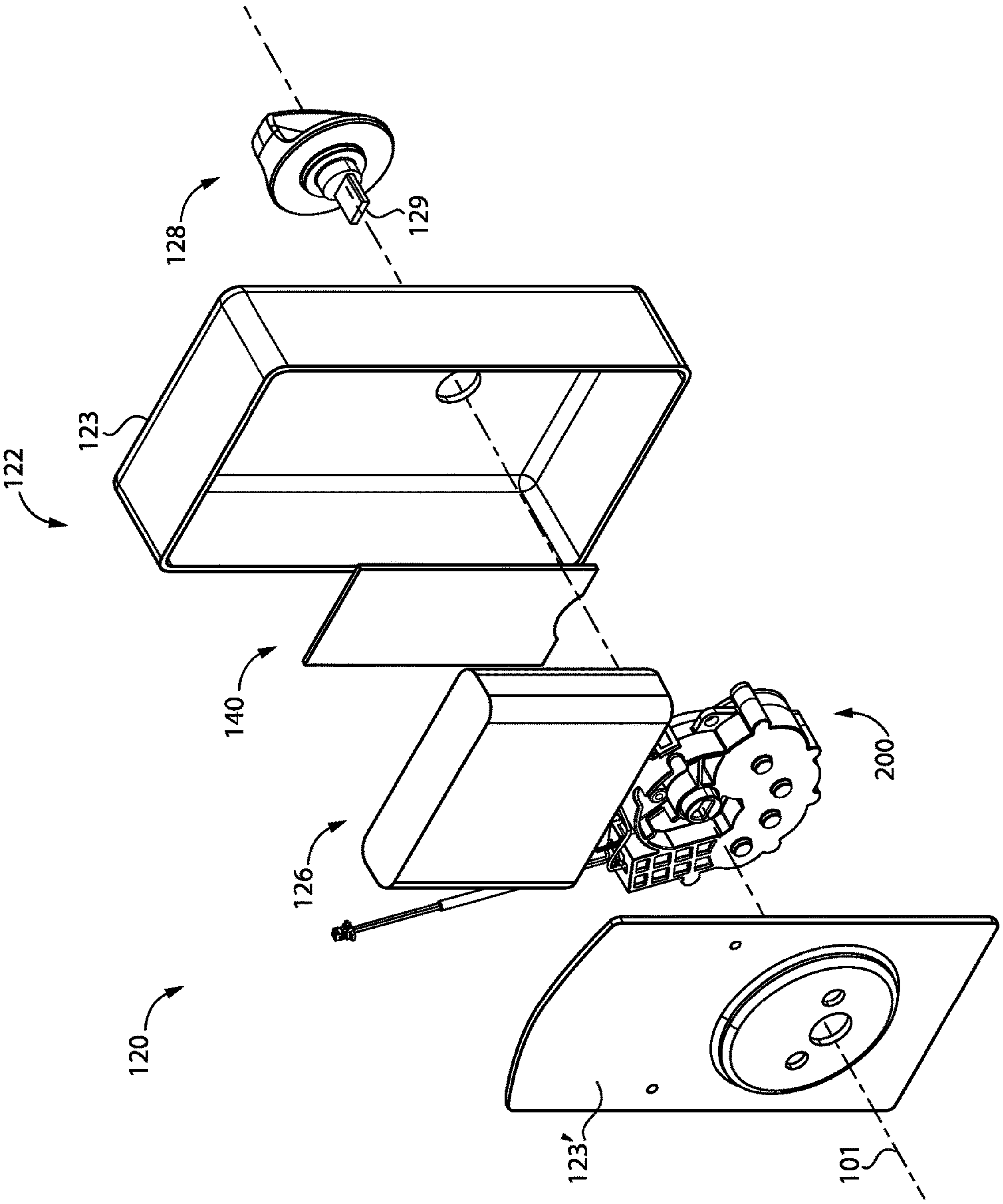
FIG. 5 is an exploded assembly view of an inside trim assembly of the lockset.

With additional reference to FIG. 5, the inside trim assembly 120 generally includes an inside housing 122, a collar 124 (FIG. 6), a power source 126 positioned in the housing, a manual actuator 128 mounted for rotation relative to the housing 122, a control assembly 140 positioned in the housing 122, and a modular drive assembly 200 according to certain embodiments. The housing 122 generally includes a case 123 and a back plate 123' that at least partially encloses various components of the inside trim assembly 120 within the case 123. In the illustrated form, the power source 126 is an onboard power source, and includes one or more batteries 127. It is also contemplated that another form of onboard power source may be utilized, such as a supercapacitor. In certain embodiments, the inside trim assembly 120 may be configured for connection to line power in addition or as an alternative to including an onboard power source 126. While other forms are contemplated, the illustrated manual actuator 128 is provided in the form of a thumbturn, and includes a stem 129 that extends into the housing 122 and engages a portion of the modular drive assembly 200. More particularly, the stem 129 engages an output member 240 (FIG. 6) of the drive assembly 200 to rotationally couple the thumbturn 128 with the output member 240 as described herein.

The bolt mechanism 130 generally includes a housing 132, a bolt 134 mounted for movement relative to the housing 132, and a retractor 136 operable to move the bolt 134 between and extended position and a retracted position. The tailpiece 102 extends through and engages the retractor 136 such that rotation of the tailpiece 102 in opposite directions extends and retracts the bolt 134. As described herein, in various situations, such rotation of the tailpiece 102 may be effected by the lock cylinder 116, the thumbturn 128, or the drive assembly 200.

As will be appreciated, the bolt mechanism 130 is operable to retain the door 90 in a closed position when the bolt 134 is in its extended position, and is inoperable to retain the door 90 in the closed position when the bolt 134 is in its retracted position. In the illustrated form, the bolt mechanism 130 is provided in the form of an unbiased deadbolt mechanism, in which the nose of the bolt 134 is substantially flat. It is also contemplated that the bolt mechanism 130 may be provided in the form of a latchbolt mechanism, in which the bolt is biased toward the extended position and includes a tapered nose.

Figure 6:
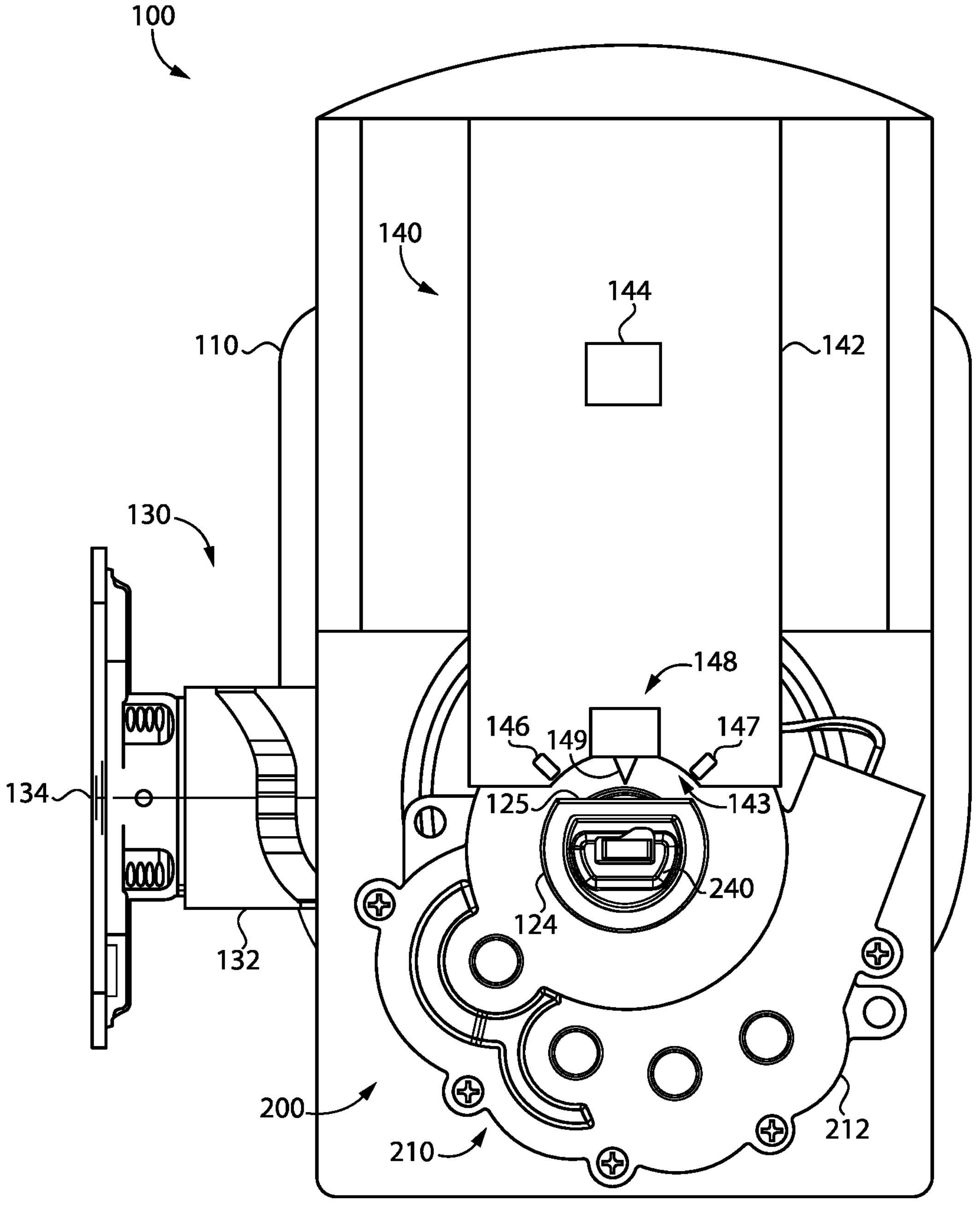
FIG. 6 is a plan view of a portion of the lockset.
Figure 17:
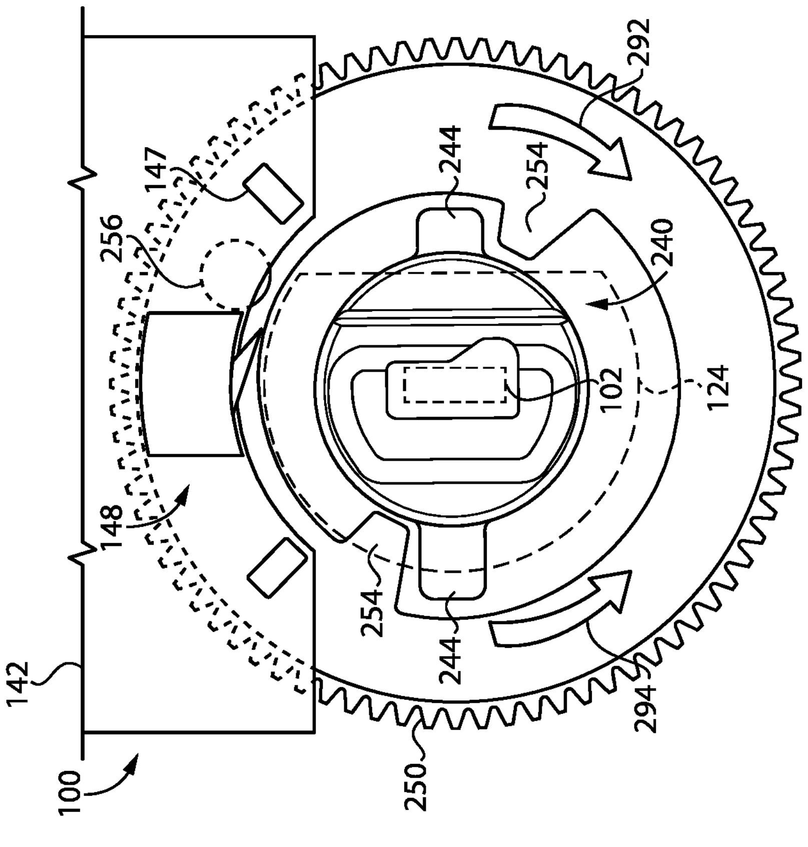
FIG. 17 illustrates a portion of the lockset in a second handedness third state, in which the output member is in the locking position and the output gear is in a second handedness second home position.

With additional reference to FIG. 6, the control assembly 140 generally includes a printed circuit board (PCB) 142 and a controller 144 mounted to the PCB 142, and may alternatively be referred to as the printed circuit board assembly (PCBA) 140. The illustrated PCBA 140 further includes a first magnetic sensor 146, a second magnetic sensor 147 spaced apart from the first magnetic sensor 146, and a triangle switch 148 positioned generally between the first magnetix sensor 146 and the second magnetic sensor 147. While other forms are contemplated, in the illustrated embodiment, each of the magnetic sensors 146, 147 is provided in the form of a Hall effect sensor. A bottom edge of the PCB 142 includes a recess 143, which in the illustrated form is arcuate. The first magnetic sensor 146 and the second magnetic sensor 147 are mounted to the PCB 142 near the bottom edge and adjacent the recess 143. The triangle switch 148 is also mounted adjacent the recess 143 such that an actuating arm 149 of the triangle switch 148 projects beyond the periphery of the recess 143. As described herein, the first magnetic sensor 146 is operable to detect a magnet 256 when an output gear 250 is in each of a first handedness first home position (FIG. 11) and a first handedness second home position (FIG. 13), and the second magnetic sensor 147 is operable to detect the magnet 256 when the output gear 250 is in a second handedness first home position (FIG. 15) and a second handedness second home position (FIG. 17).

As noted above, the inside trim assembly 120 includes a collar 124. The collar 124 is rotationally coupled with the output member 240, and thus with the thumbturn 128. The illustrated collar 124 is generally D-shaped, and includes a flat 125 that faces the triangle switch 148 when the output member 240 is in an output member unlocking position. As described herein, the unlocking position of the output member 240 corresponds to the retracted position of the bolt 134, and rotation of the output member 240 from the unlocking position and in a locking direction moves the output member 240 to an output member locking position and drives the bolt 134 to the extended position. As will be appreciated, the locking direction may be different depending on the handedness of the lockset 100. More particularly, the locking direction may be a first direction (i.e., one the clockwise direction or the counter-clockwise direction) when the lockset 100 is provided with a first handedness (i.e., one of a left-handed configuration or a right-handed configuration), and may be a second direction (i.e., the other of the clockwise direction or the counter-clockwise direction) when the lockset 100 is provided with a second handedness (i.e., the other of the left-handed configuration or the right-handed configuration).

During manual rotation of the output member 240 in the locking direction (e.g., by the thumbturn 128), the flat 125 of the collar 124 pushes the actuating arm 149 in a corresponding direction, thereby indicating to the controller 144 whether the lockset 100 has been provided with the right-handed configuration or the left-handed configuration. For example, rotation of the output member 240 in the first rotational direction (e.g., clockwise) may cause the flat 125 to push the actuating arm 149 in a first direction (e.g., rightward), thereby causing the triangle switch 148 to transmit to the controller 144 a signal indicating that the lockset has been provided with the first handedness (e.g., the left-handed configuration). Conversely, rotation of the output member 240 in the second rotational direction (e.g., counter-clockwise) may cause the flat 125 to push the actuating arm 149 in a second direction (e.g., leftward), thereby causing the triangle switch 148 to transmit to the controller 144 a signal indicating that the lockset has been provided with the second handedness (e.g., the right-handed configuration).

Figure 7:
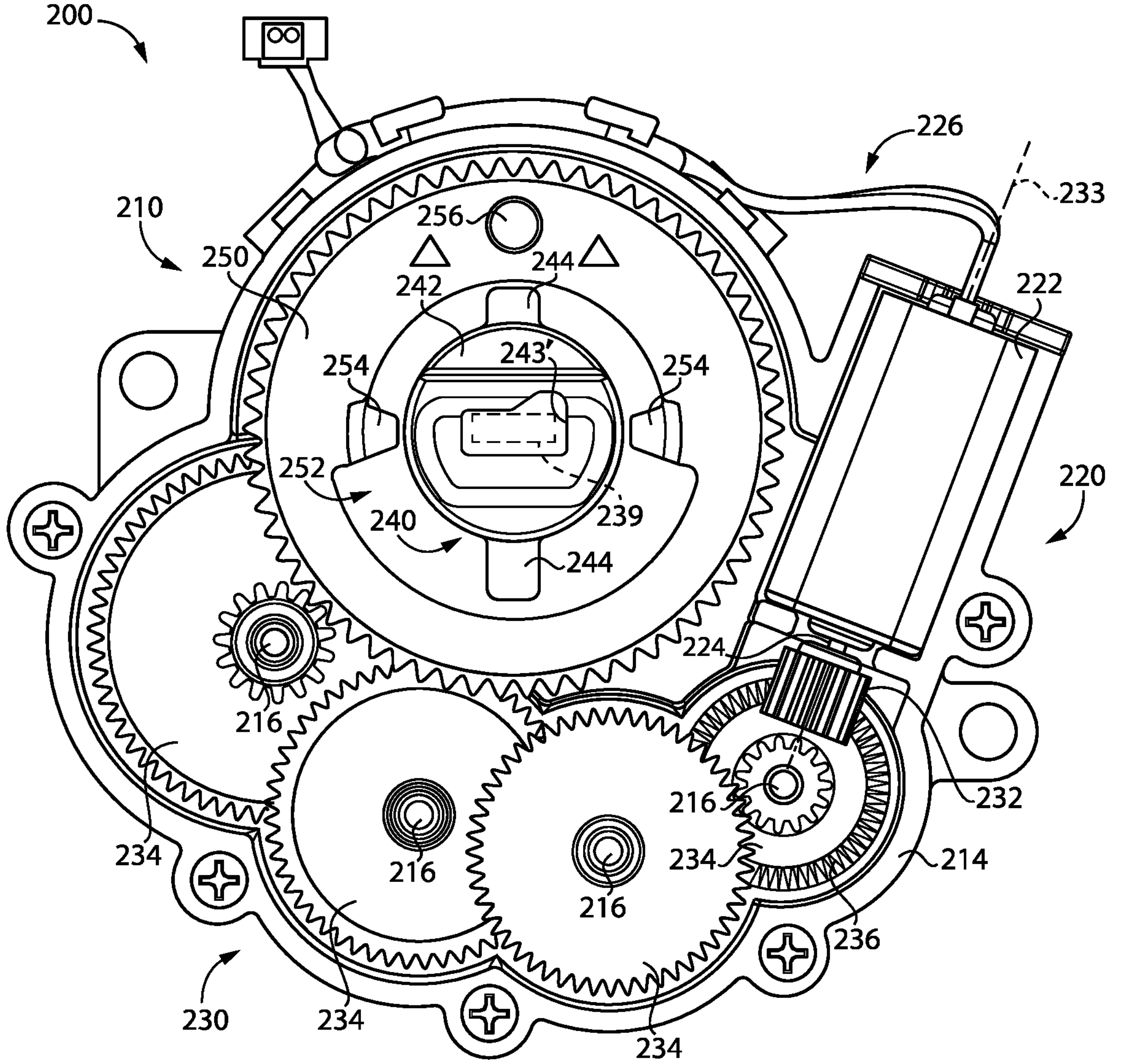
FIG. 7 is a first plan view of a modular drive assembly according to certain embodiments.
Figure 8:
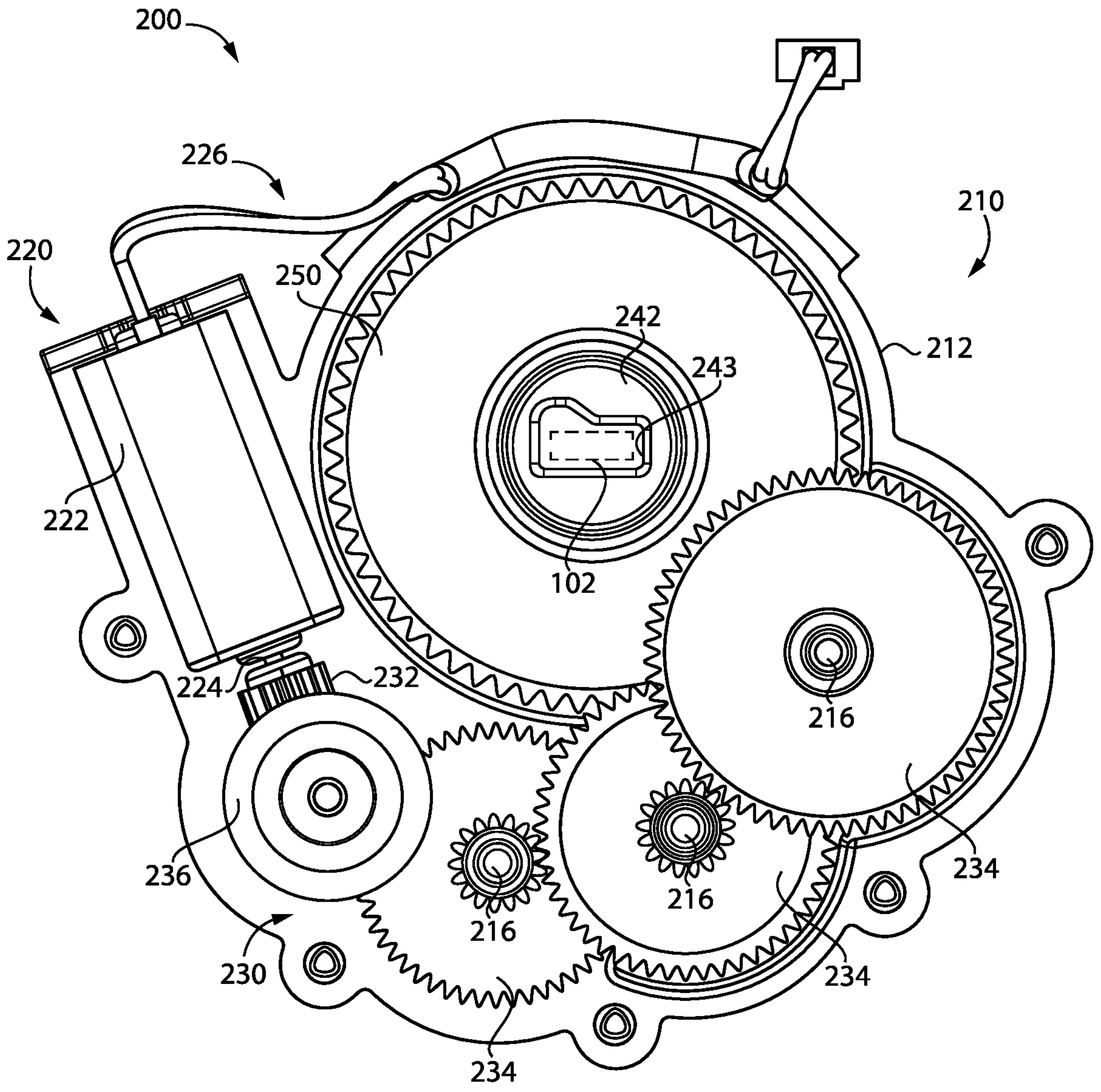
FIG. 8 is a second plan view of the modular drive assembly.

With additional reference to FIGS. 7 and 8, the drive assembly 200 generally includes a housing 210, a motor 220 mounted in the housing 210 and connected with the control assembly 140, a reduction gear train 230 engaged with the motor 220, and the output member 240, which is mounted for rotation relative to the housing 210 and operable to engage an output gear 250 of the reduction gear train 230.

The housing 210 generally includes a first housing part 212 and a second housing part 214 secured to the first housing part 212 such that the motor 220 and the reduction gear train 230 are captured within the housing 210. In the interest of clarity, the first housing part 212 is omitted from the illustration of FIG. 7, and the second housing part 214 is omitted from the illustration of FIG. 8. Rotatably mounted within the housing 210 are a plurality of axles 216, each of which rotatably secures a corresponding intermediate gear 234 of the gear train 230 to the housing 210.

The motor 220 is mounted in the housing 210, and generally includes a body 222, a motor shaft 224 rotatably mounted to the body 222, and a wire harness 226 connected between the body 222 and the PCBA 140. As described herein, the motor 220 is configured to rotate the motor shaft 224 in each of a first direction and an opposite second direction.

The reduction gear train 230 is configured to cause the output member 240 to rotate in response to rotation of the motor shaft 224, and generally includes an input gear 232 coupled with the motor shaft 224 and an output gear 250 operable to engage the output member 240, and in the illustrated form further includes one or more intermediate gears 234 engaged between the input gear 232 and the output gear 250. In the illustrated embodiment, the intermediate gears 234 and the output gear 250 rotate about substantially horizontal axes defined by the axles 216, and the input gear 232 coupled to the motor shaft 224 rotates about an axis 233 transverse to the horizontal direction. The illustrated intermediate gears 234 include a crown gear 236, which meshes with the input gear 232 and translates rotation of the input gear 232 about the transverse axis 233 to rotation of the intermediate gears 234 about the substantially horizontal axles 216.

Figure 9:
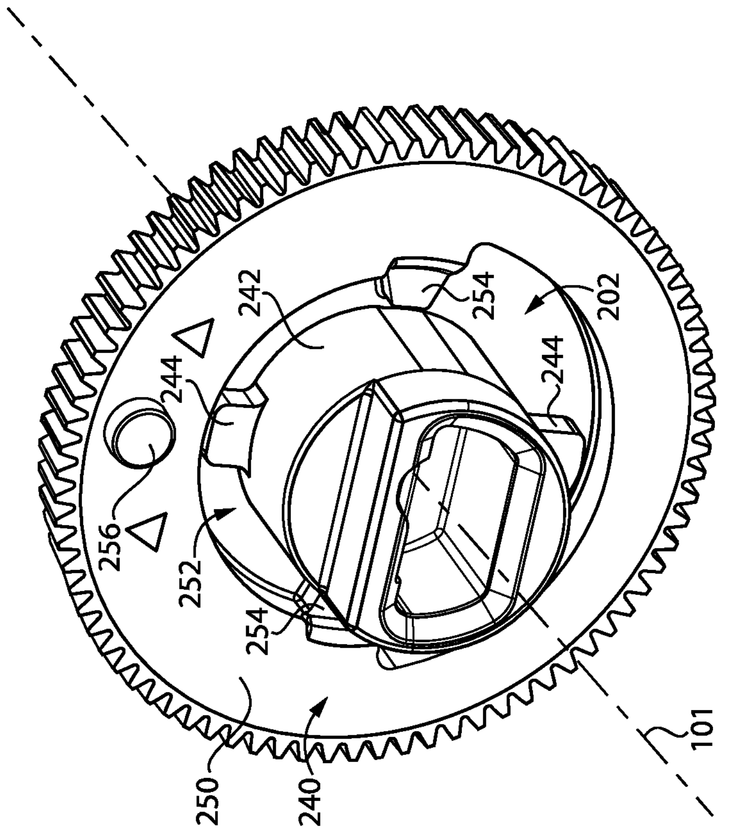
FIG. 9 is a perspective view of an output gear and an output member.

With additional reference to FIG. 9, the output member 240 is rotatably supported by the housing 210, and generally includes a body portion 242 extending along the longitudinal axis 101, and a pair of arms 244 projecting radially from opposite sides of the body portion 242. The body portion 242 extends through an opening in the output gear 250 and rotatably supports the output gear 250. Each end of the body portion 242 includes a corresponding and respective opening into which another component extends. More particularly, one end of the body portion 242 defines a first opening 243 into which the tailpiece 102 extends, and the opposite end of the body portion 242 defines a second opening 243' into which the stem 129 of the thumbturn 128 extends. In the illustrated form, the openings 243, 243' are connected with one another. In other embodiments, the openings 243, 243' may be separated from one another, for example by a wall. The openings 243, 243', the tailpiece 102, and the stem 129 are sized and shaped for rotational coupling such that the tailpiece 102, the thumbturn 128, and the output member 240 are coupled for joint rotation about the longitudinal axis 101.

Figure 10:
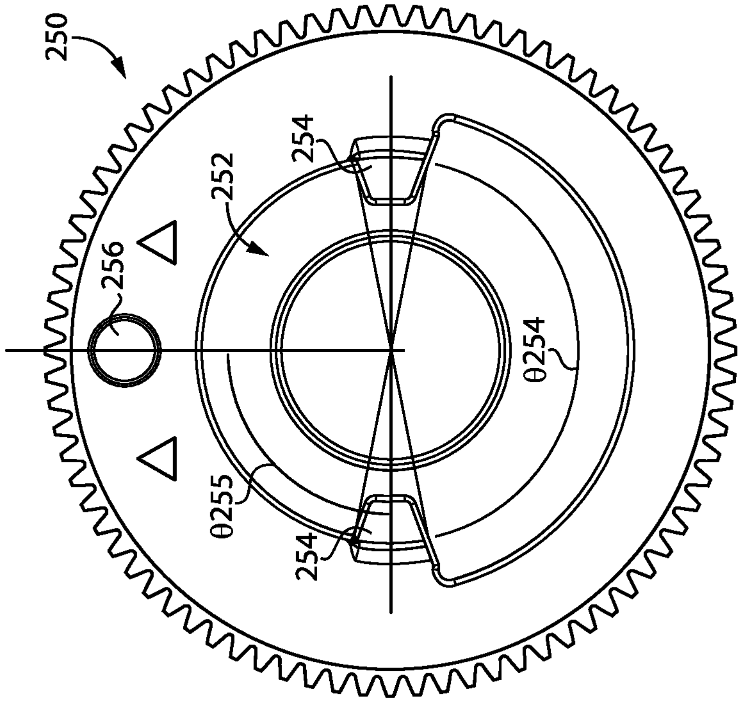
FIG. 10 is a plan view of the output gear.

With additional reference to FIG. 10, the illustrated output gear 250 includes a recessed region 252 that is defined in part by a pair of projections 254, and a magnet 256 is mounted to the body of the output gear 250. In the orientation illustrated in FIG. 10, the magnet 256 is located at the 12 o'clock position, and the projections 254 are located at the 3 o'clock position and the 9 o'clock positions. Thus, the angle defined between the center points of the projections 254 (relative to the longitudinal rotational axis 101) is about 180°, and the angle θ255 formed between the center point of each projection 254 and the center point of the magnet 256 (relative to the longitudinal rotational axis 101) is about 90°. Due to the thickness of the projections, the angle θ254 between the lower edges of the projections 254 (relative to the longitudinal rotational axis 101) is about 170° (e.g., between 165° and 175°).

As described herein, rotation of the output member 240 from its unlocking position and in a locking direction moves the output member 240 to its locking position, and causes the tailpiece 102 to drive the bolt 134 from its retracted position to its extended position. Conversely, rotation of the output member 240 from its locking position and in an unlocking direction opposite the locking direction moves the output member 240 to its unlocking position, and causes the tailpiece 102 to drive the bolt 134 from its extended position to its retracted position. As will be appreciated, which direction is the locking direction and which direction is the unlocking direction depends upon the handedness of the lockset 100.

In certain situations, the rotation of the output member 240 for extension/retraction of the bolt 134 may be performed manually. For example, a user facing the egress side 92 of the door 90 and desiring to extend the bolt 134 may rotate the thumbturn 128 in the locking direction, thereby rotating the output member 240 in the locking direction and extending the bolt 134. Similarly, when the user facing the egress side 92 desires to retract the bolt 134 manually, the user may rotate the thumbturn 128 in the unlocking direction, thereby rotating the output member 240 in the unlocking direction and retracting the bolt 134.

In the illustrated form, the lockset 100 can also be mechanically locked and unlocked by a user facing the non-egress side 91 of the door 90. More particularly, a user possessing the proper key 118 may actuate the lock cylinder 116 in the appropriate locking/unlocking direction to extend/retract the bolt 134. In certain forms, the plug 117 may rotate through a predetermined lost motion angle before beginning to rotate the tailpiece 102 for extension/retraction of the bolt 134. It is also contemplated that the plug 117 may be rotationally coupled with the tailpiece 102 without lost rotational motion.

From the exterior side 91 of the door 90, the illustrated lockset 100 can also be locked and/or unlocked electronically. For example, a user possessing a proper credential (e.g., password, PIN, card, digital credential, or biometric credential) may transmit the credential to the controller 144 via the credential reader 114. When the entered credential matches a valid credential, the controller 144 may transmit to the motor 220 an unlocking signal that causes the motor 220 to rotate the motor shaft 224 in a first direction, thereby causing the output gear 250 to rotate the output member 240 in the unlocking direction for retraction of the bolt 134. In response to a relock condition (e.g., a time condition, entry of a credential, and/or depression of a relock key 115'), the controller 144 may transmit to the motor 220 a locking signal that causes the motor 220 to rotate the motor shaft 224 in a second direction, thereby causing the output gear 250 to rotate the output member 240 in the locking direction for extension of the bolt 134.

With additional reference to FIGS. 11-14, illustrated therein is a portion of the lockset 100 during operation in a first handing configuration. In the first handing configuration, the bolt mechanism 130 is installed in a first orientation in which rotation of the output member 240 in the counter-clockwise direction 294 extends the bolt 134, and rotation of the output member 240 in the clockwise direction 292 retracts the bolt 134. Stated another way, for the first handing configuration, the locking direction is the counter-clockwise direction 294, and the unlocking direction is the clockwise direction 292.

Figure 11:
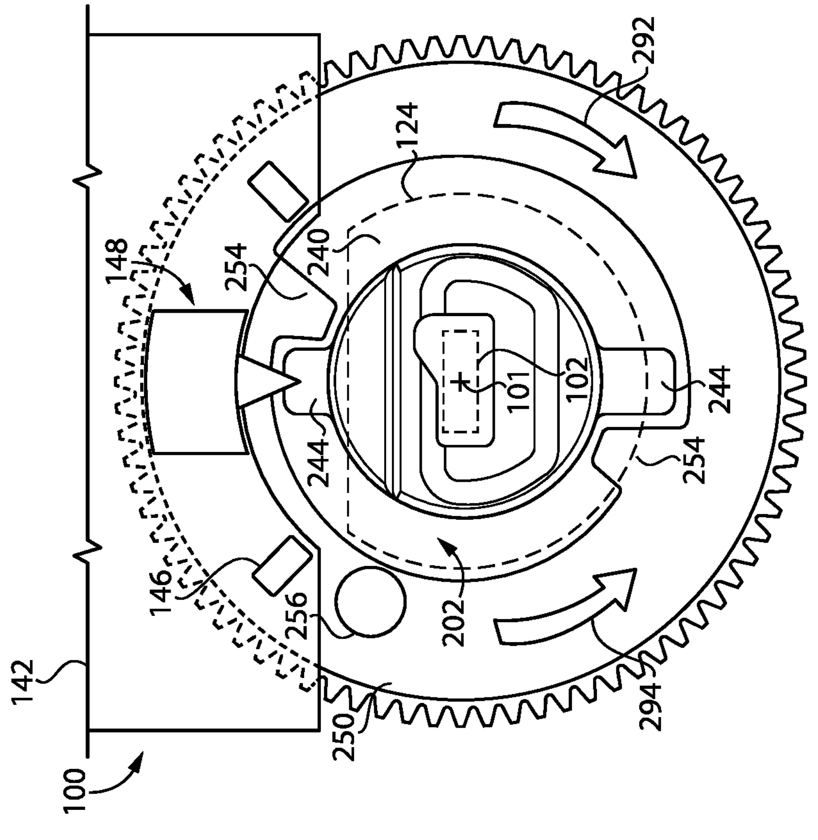
FIG. 11 illustrates a portion of the lockset in a first handedness first state, in which the output member is in an unlocking position and the output gear is in a first handedness first home position.

FIG. 11 illustrates the portion of the lockset 100 in a first handedness first state that corresponds to the unlocked condition of the lockset 100. In this state, the arms 244 are vertically aligned with one another at the 12 o'clock and 6 o'clock positions, and the cross-section of the tailpiece 102 is substantially horizontal. Additionally, the output gear 250 is in a first handedness first home position, in which the projections 254 are located at the 1 o'clock position and the 7 o'clock position, and the magnet 256 is located at the 10 o'clock position. Thus, the projections 254 are adjacent the arms 244, and the first magnetic sensor 146 is capable of detecting the magnet 256.

In the first handedness first state, the user may manually lock the lockset 100, for example by rotating the thumbturn 128 in the counter-clockwise direction 294 or actuating the lock cylinder 116 in a first bolt-extending direction. In such an event, the output member 240 is free to rotate through its normal bolt-extending rotational range without back-driving the motor 220. More particularly, the lost rotational motion connection 202 defined between the output member 240 and the output gear 250 enables the output member 240 to rotate through its normal bolt-extending rotational range without causing the arms 244 to engage the projections 254. As a result, the lockset 100 can be mechanically locked and unlocked without affecting the position of the output gear 250.

In order to electronically lock the lockset 100, the controller 144 may transmit to the motor 220 a first locking signal, for example in response to depression of the relock key 115'. Responsive to the first locking signal, the motor 220 rotates the motor shaft 224 in a direction that causes the gear train 230 to drive the output gear 250 to rotate in the first handedness locking direction, which in the illustrated embodiment is the counter-clockwise direction 294. Such rotation of the output gear 250 in the counter-clockwise direction 294 causes the projections 254 to engage the arms 244 and drive the output member 240 in the counter-clockwise direction 294, thereby causing a corresponding rotation of the tailpiece 102 and extension of the bolt 134. Such rotation of the output gear 250 in the counter-clockwise direction 294 moves the lockset 100 to the state illustrated in FIG. 12.

Figure 12:
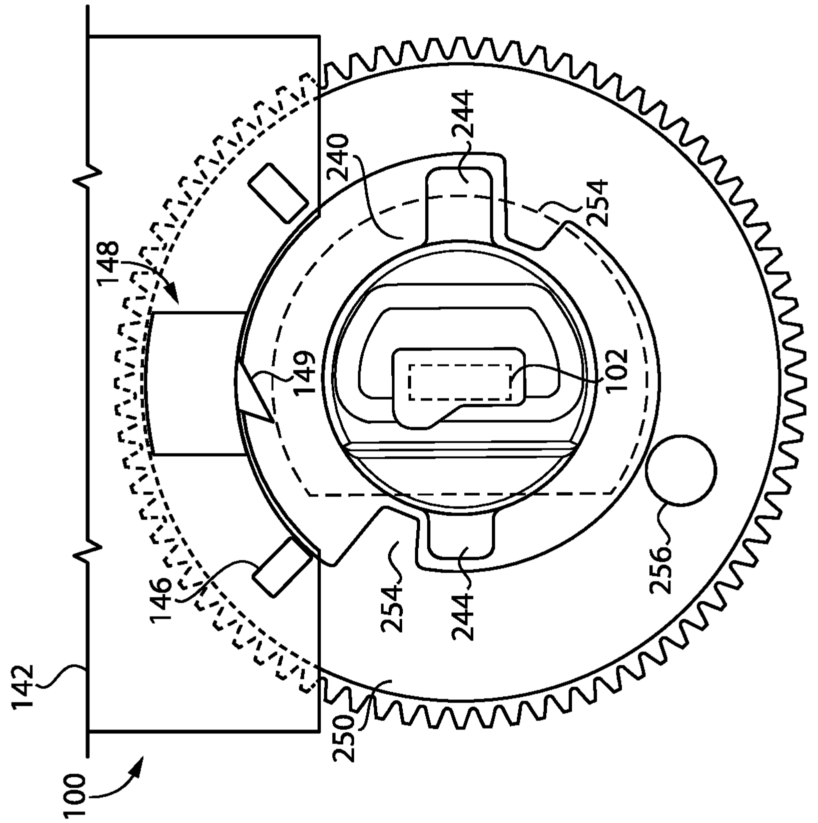
FIG. 12 illustrates a portion of the lockset in a first handedness second state, in which the output member is in a locking position and the output gear is in a first handedness first rotated position.

FIG. 12 illustrates the portion of the lockset 100 in a first handedness second state. The lockset 100 may transition from the first handedness first state to the first handedness second state by operating the motor 220 for a predetermined period of time, or in the case of a stepper motor, for a predetermined number of pulses. In the first handedness second state, the arms 244 are horizontally aligned with one another at the 3 o'clock and 9 o'clock positions, and the cross-section of the tailpiece 102 is substantially vertical. Additionally, the output gear 250 is in a first handedness rotated position, in which the projections 254 are located at the 4 o'clock position and the 10 o'clock position, and the magnet 256 is located at the 7 o'clock position. Additionally, the collar 124 has actuated the triangle switch 148 in a first handedness direction (to the left), thereby causing the triangle switch 148 to transmit to the controller 144 a signal indicating that the lockset 100 is in the first handing configuration and the locked state.

Figure 13:
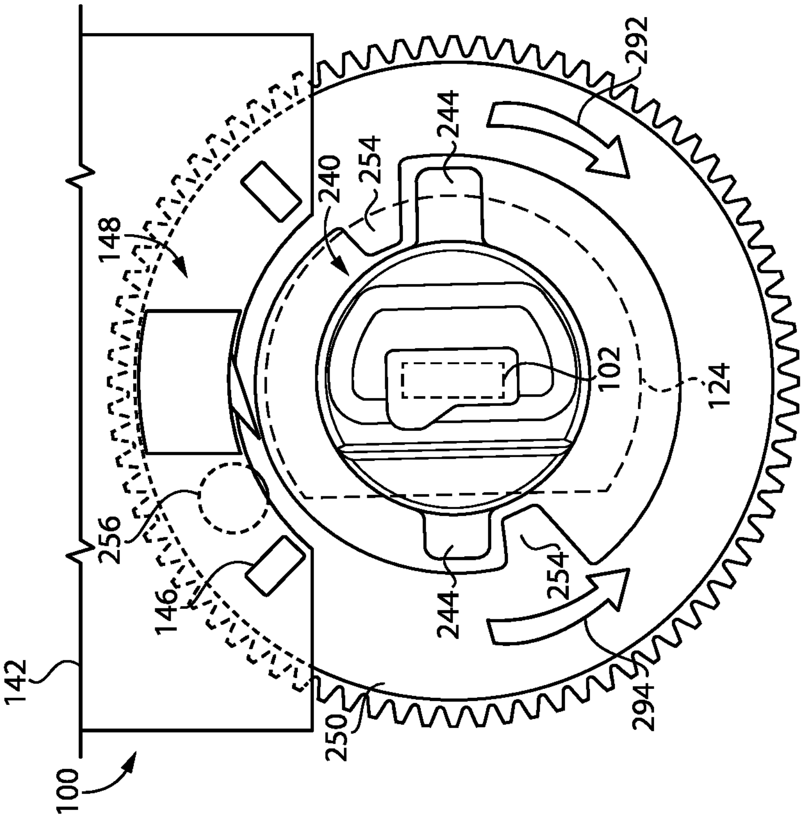
FIG. 13 illustrates a portion of the lockset in a first handedness third state, in which the output member is in the locking position and the output gear is in a first handedness second home position.

After reaching the first handedness second state, the lockset 100 may move to a first handedness third state (FIG. 13). For example, following the predetermined period of time and/or the predetermined number of pulses, the controller 144 may transmit to the motor 220 a first handedness first return signal. Responsive to the first handedness first return signal, the motor 220 rotates the motor shaft 224 in a direction that causes the gear train 230 to drive the output gear 250 to rotate in the first handedness unlocking direction, which in the illustrated embodiment is the clockwise direction 292. As a result, the projections 254 move away from the arms 244 as the output gear 250 rotates to a first handedness second home position (FIG. 13). Thus, during return of the output gear 250 from the first handedness first rotated position (FIG. 12) to the first handedness second home position (FIG. 13), the output member 240 remains in the output member locking position. The controller 144 may cause the motor 220 to cease rotating the motor shaft 224 upon detecting, via the first magnetic sensor 146, that the output gear 250 has reached the first handedness second home position.

FIG. 13 illustrates the portion of the lockset 100 in the first handedness third state, in which the output gear 250 is in the first handedness second home position. In this state, the output member 240 is in the output member locking position, in which the cross-section of the tailpiece 102 is vertically-oriented, and the arms 244 are horizontally aligned at the 3 o'clock position and the 9 o'clock position. Additionally, the output gear 250 is in the first handedness second home position, in which the projections 254 are located at the 2 o'clock position and the 8 o'clock position, and the magnet 256 is located at the 11 o'clock position. Thus, the projections 254 are once again adjacent the arms 244, and the first magnetic sensor 146 is capable of detecting the magnet 256.

In the first handedness third state, the user may manually unlock the lockset 100, for example by rotating the thumbturn 128 in the clockwise direction 292 or actuating the lock cylinder 116 in a bolt-retracting direction. In such an event, the output member 240 is free to rotate through its normal bolt-retracting rotational range without back-driving the motor 220. More particularly, the lost rotational motion connection 202 defined between the output member 240 and the output gear 250 enables the output member 240 to rotate through its normal bolt-retracting rotational range without causing the arms 244 to engage the projections 254. As a result, the lockset 100 can be mechanically locked and unlocked without affecting the position of the output gear 250.

In order to electronically unlock the lockset 100, the controller 144 may transmit to the motor 220 a first unlocking signal, for example in response to entry of an authorized access code via the credential reader 114. Responsive to the first unlocking signal, the motor 220 rotates the motor shaft 224 in a direction that causes the gear train 230 to drive the output gear 250 to rotate in the first handedness unlocking direction, which in the illustrated embodiment is the clockwise direction 292. Such rotation of the output gear 250 in the clockwise direction 292 causes the projections 254 to engage the arms 244 and drive the output member 240 in the clockwise direction 292 to the first handedness second rotated position (FIG. 14), thereby causing a corresponding rotation of the tailpiece 102 and retraction of the bolt 134.

Figure 14:
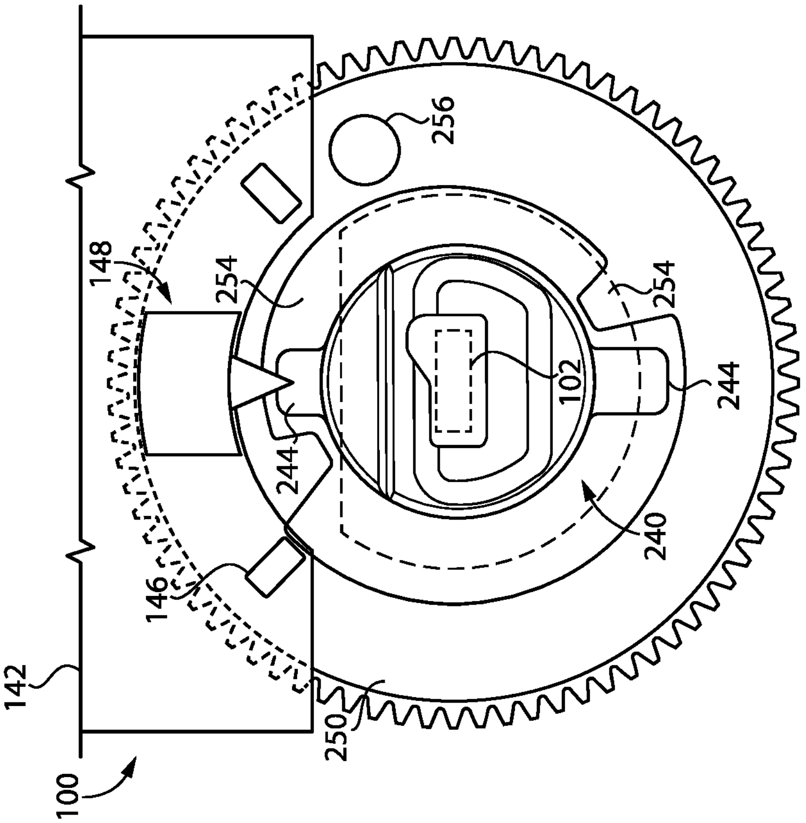
FIG. 14 illustrates a portion of the lockset in a first handedness fourth state, in which the output member is in the unlocking position and the output gear is in a first handedness second rotated position.

FIG. 14 illustrates the portion of the lockset 100 in a first handedness fourth state. The lockset 100 may transition from the first handedness third state to the first handedness fourth state by operating the motor 220 for a predetermined period of time, or in the case of a stepper motor, for a predetermined number of pulses. In the first handedness fourth state, the arms 244 are vertically aligned with one another at the 12 o'clock and 6 o'clock positions, and the cross-section of the tailpiece 102 is oriented horizontally. Additionally, the output gear 250 is in a first handedness second rotated position, in which the projections 254 are located at the 11 o'clock position and the 5 o'clock position, and the magnet 256 is located at the 2 o'clock position.

After transitioning the lockset 100 to the first handedness fourth state, the controller 144 may transmit to the motor 220 a first handedness second return signal that causes the motor 220 to return the output gear 250 to the first handedness first home position, thereby returning the lockset 100 to the first handedness first configuration (FIG. 11). The controller 144 may cause the motor 220 to cease rotating the motor shaft 224 upon detecting, via the first magnetic sensor 146, that the output gear 250 has returned to the first handedness first home position.

With additional reference to FIGS. 15-18, illustrated therein is a portion of the lockset 100 during operation in a second handing configuration. In the second handing configuration, the bolt mechanism 130 is installed in a second orientation opposite the first orientation such that rotation of the output member 240 in the clockwise direction 292 extends the bolt 134, and rotation of the output member 240 in the counter-clockwise direction 294 retracts the bolt 134. Stated another way, for the second handing configuration, the locking direction is the clockwise direction 292, and the unlocking direction is the counter-clockwise direction 294.

Figure 15:
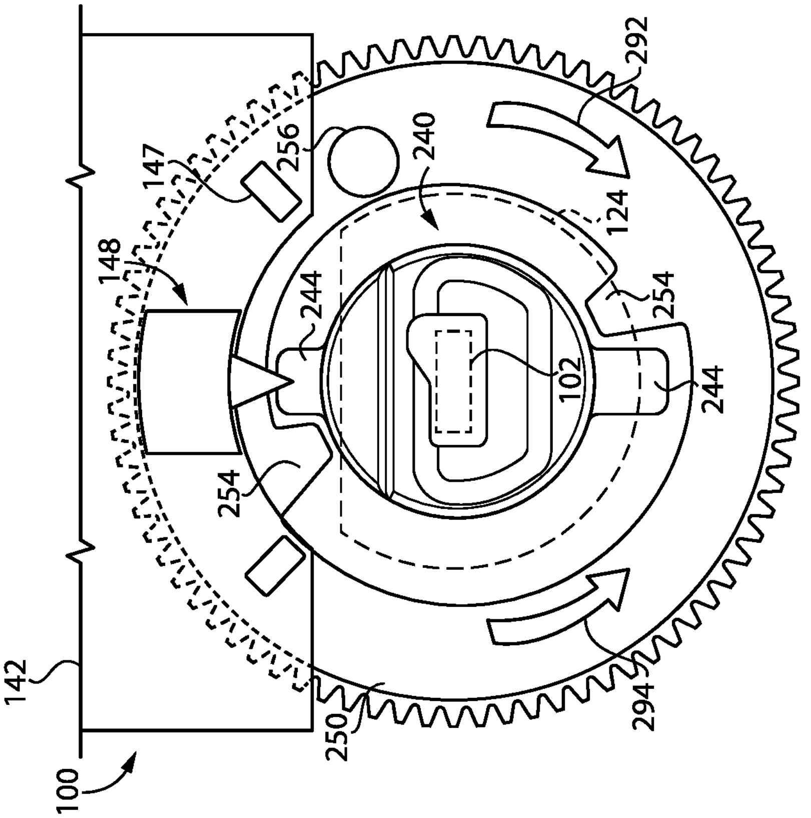
FIG. 15 illustrates a portion of the lockset in a second handedness first state, in which the output member is in the unlocking position and the output gear is in a second handedness first home position.

FIG. 15 illustrates the portion of the lockset 100 in a second handedness first state that corresponds to the unlocked condition of the lockset 100. In this state, the arms 244 are vertically aligned with one another at the 12 o'clock and 6 o'clock positions, and the cross-section of the tailpiece 102 is substantially horizontal. Additionally, the output gear 250 is in a second handedness first home position, in which the projections 254 are located at the 11 o'clock position and the 5 o'clock position, and the magnet 256 is located at the 2 o'clock position. Thus, the projections 254 are adjacent the arms 244, and the second magnetic sensor 147 is capable of detecting the magnet 256.

In the second handedness first state, the user may manually lock the lockset 100, for example by rotating the thumbturn 128 in the clockwise direction 293 or actuating the lock cylinder 116 in a second bolt-extending direction. In such an event, the output member 240 is free to rotate through its normal bolt-extending rotational range without back-driving the motor 220. More particularly, the lost rotational motion connection 202 defined between the output member 240 and the output gear 250 enables the output member 240 to rotate through its normal bolt-extending rotational range without causing the arms 244 to engage the projections 254. As a result, the lockset 100 can be mechanically locked and unlocked without affecting the position of the output gear 250.

In order to electronically lock the lockset 100, the controller 144 may transmit to the motor 220 a second locking signal, for example in response to depression of the relock key 115'. Responsive to the second locking signal, the motor 220 rotates the motor shaft 224 in a direction that causes the gear train 230 to drive the output gear 250 to rotate in the second handedness locking direction, which in the illustrated embodiment is the clockwise direction 292. Such rotation of the output gear 250 in the clockwise direction 292 causes the projections 254 to engage the arms 244 and drive the output member 240 in the clockwise direction 292, thereby causing a corresponding rotation of the tailpiece 102 and extension of the bolt 134. Such rotation of the output gear 250 in the clockwise direction 292 moves the lockset 100 to the state illustrated in FIG. 16.

Figure 16:
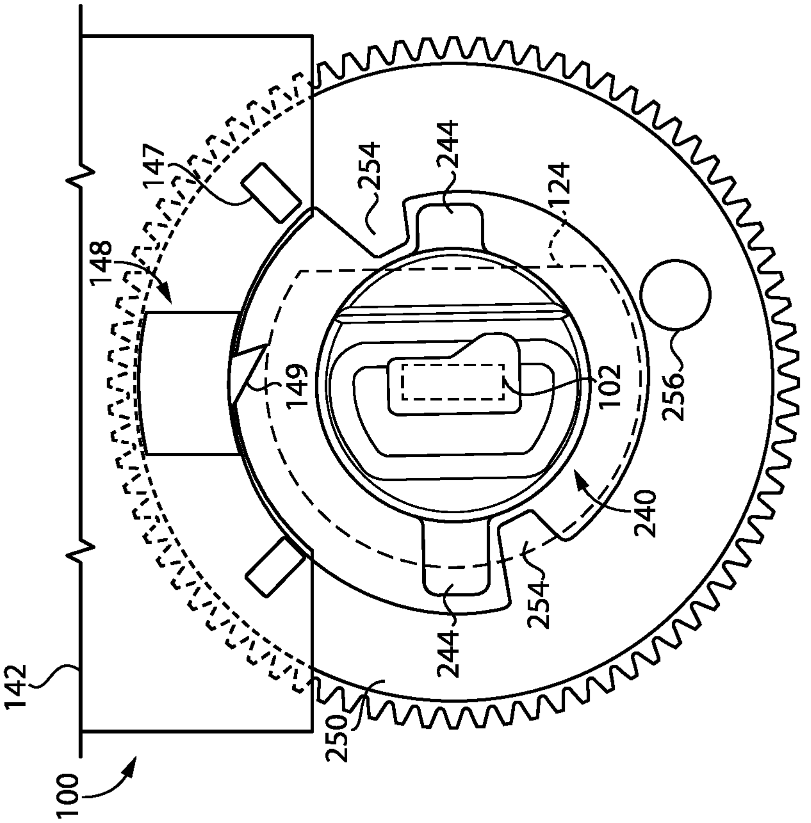
FIG. 16 illustrates a portion of the lockset in a second handedness second state, in which the output member is in the locking position and the output gear is in a second handedness first rotated position.

FIG. 16 illustrates the portion of the lockset 100 in a second handedness second state. The lockset 100 may transition from the second handedness first state to the second handedness second state by operating the motor 220 for a predetermined period of time, or in the case of a stepper motor, for a predetermined number of pulses. In the second handedness second state, the arms 244 are horizontally aligned with one another at the 3 o'clock and 9 o'clock positions, and the cross-section of the tailpiece 102 is vertically oriented. Additionally, the output gear 250 is in a second handedness first rotated position, in which the projections 254 are located at the 2 o'clock position and the 8 o'clock position, and the magnet 256 is located at the 5 o'clock position. Additionally, the collar 124 has actuated the triangle switch 148 in a second handedness direction (to the right), thereby causing the triangle switch 148 to transmit to the controller 144 a signal indicating that the lockset 100 is in the second handing configuration and the locked state.

After reaching the second handedness second state, the lockset 100 may move to a second handedness third state (FIG. 17). For example, following the predetermined period of time and/or the predetermined number of pulses, the controller 144 may transmit to the motor 220 a second handedness first return signal. Responsive to the second handedness first return signal, the motor 220 rotates the motor shaft 224 in a direction that causes the gear train 230 to drive the output gear 250 to rotate in the second handedness unlocking direction, which in the illustrated embodiment is the counter-clockwise direction 294. As a result, the projections 254 move away from the arms 244 as the output gear 250 rotates to a second handedness second home position (FIG. 17). Thus, during return of the output gear 250 from the second handedness rotated position (FIG. 16) to the second handedness second home position (FIG. 17), the output member 240 remains in the output member locking position. The controller 144 may cause the motor 220 to cease rotating the motor shaft 224 upon detecting, via the second magnetic sensor 147, that the output gear 250 has reached the second handedness second home position.

FIG. 17 illustrates the portion of the lockset 100 in the second handedness third state, in which the output gear 250 is in the second handedness second home position. In this state, the output member 240 is in the output member locking position, in which the cross-section of the tailpiece 102 is vertically-oriented, and the arms 244 are horizontally aligned at the 3 o'clock position and the 9 o'clock position. Additionally, the output gear 250 is in the second handedness second home position, in which the projections 254 are located at the 4 o'clock position and the 10 o'clock position, and the magnet 256 is located at the 1 o'clock position. Thus, the projections 254 are once again adjacent the arms 244, and the second magnetic sensor 147 is capable of detecting the magnet 256.

In the second handedness third state, the user may manually unlock the lockset 100, for example by rotating the thumbturn 128 in the counter-clockwise direction 294 or actuating the lock cylinder 116 in a second bolt-retracting direction. In such an event, the output member 240 is free to rotate through its normal bolt-retracting rotational range without back-driving the motor 220. More particularly, the lost rotational motion connection 202 defined between the output member 240 and the output gear 250 enables the output member 240 to rotate through its normal bolt-retracting rotational range without causing the arms 244 to engage the projections 254. As a result, the lockset 100 can be mechanically locked and unlocked without affecting the position of the output gear 250.

In order to electronically unlock the lockset 100, the controller 144 may transmit to the motor 220 a second unlocking signal, for example in response to entry of an authorized access code via the credential reader 114. Responsive to the second unlocking signal, the motor 220 rotates the motor shaft 224 in a direction that causes the gear train 230 to drive the output gear 250 to rotate in the second handedness unlocking direction, which in the illustrated embodiment is the counter-clockwise direction 294. Such rotation of the output gear 250 in the counter-clockwise direction 294 causes the projections 254 to engage the arms 244 and drive the output member 240 in the counter-clockwise direction 294, thereby causing a corresponding rotation of the tailpiece 102 and retraction of the bolt 134.

Figure 18:
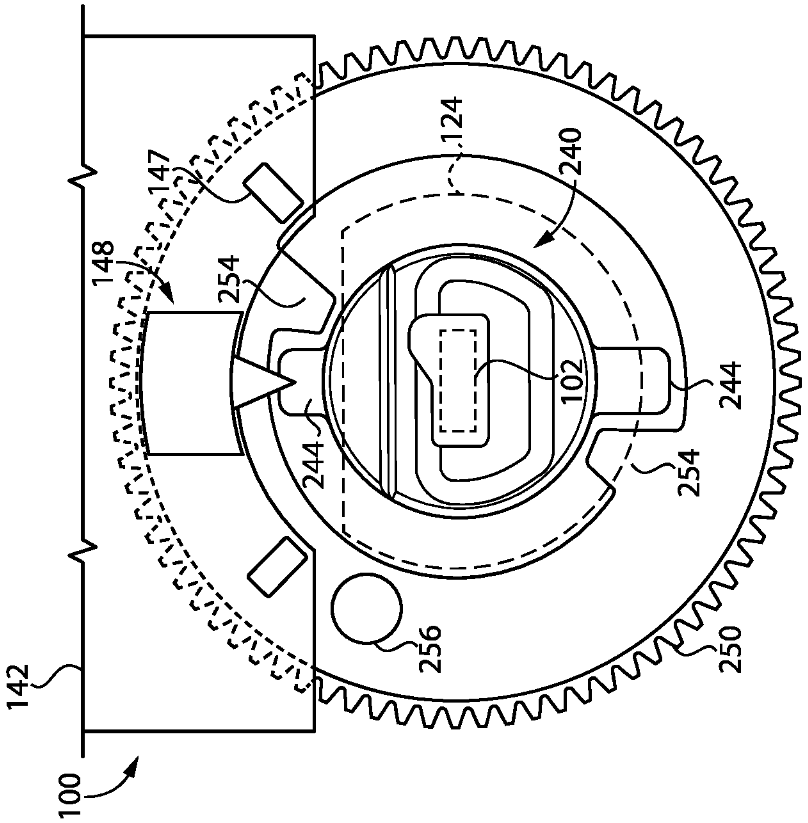
FIG. 18 illustrates a portion of the lockset in a second handedness fourth state, in which the output member is in the unlocking position and the output gear is in a second handedness second rotated position.

FIG. 18 illustrates the portion of the lockset 100 in a second handedness fourth state. The lockset 100 may transition from the second handedness third state to the second handedness fourth state by operating the motor 220 for a predetermined period of time, or in the case of a stepper motor, for a predetermined number of pulses. In the second handedness fourth state, the arms 244 are vertically aligned with one another at the 12 o'clock and 6 o'clock positions, and the cross-section of the tailpiece 102 is oriented horizontally. Additionally, the output gear 250 is in a second handedness second rotated position, in which the projections

254 are located at the 1 o'clock position and the 7 o'clock position, and the magnet 256 is located at the 10 o'clock position.

After moving the lockset 100 to the second handedness fourth state, the controller 144 may transmit to the motor 220 a second handedness second return signal that causes the motor 220 to return the output gear 250 to the second handedness first home position, thereby returning the lockset 100 to the second handedness first state (FIG. 15). The controller 144 may cause the motor 220 to cease rotating the motor shaft 224 upon detecting, via the second magnetic sensor 147, that the output gear 250 has returned to the second handedness first home position.

Figure 19:
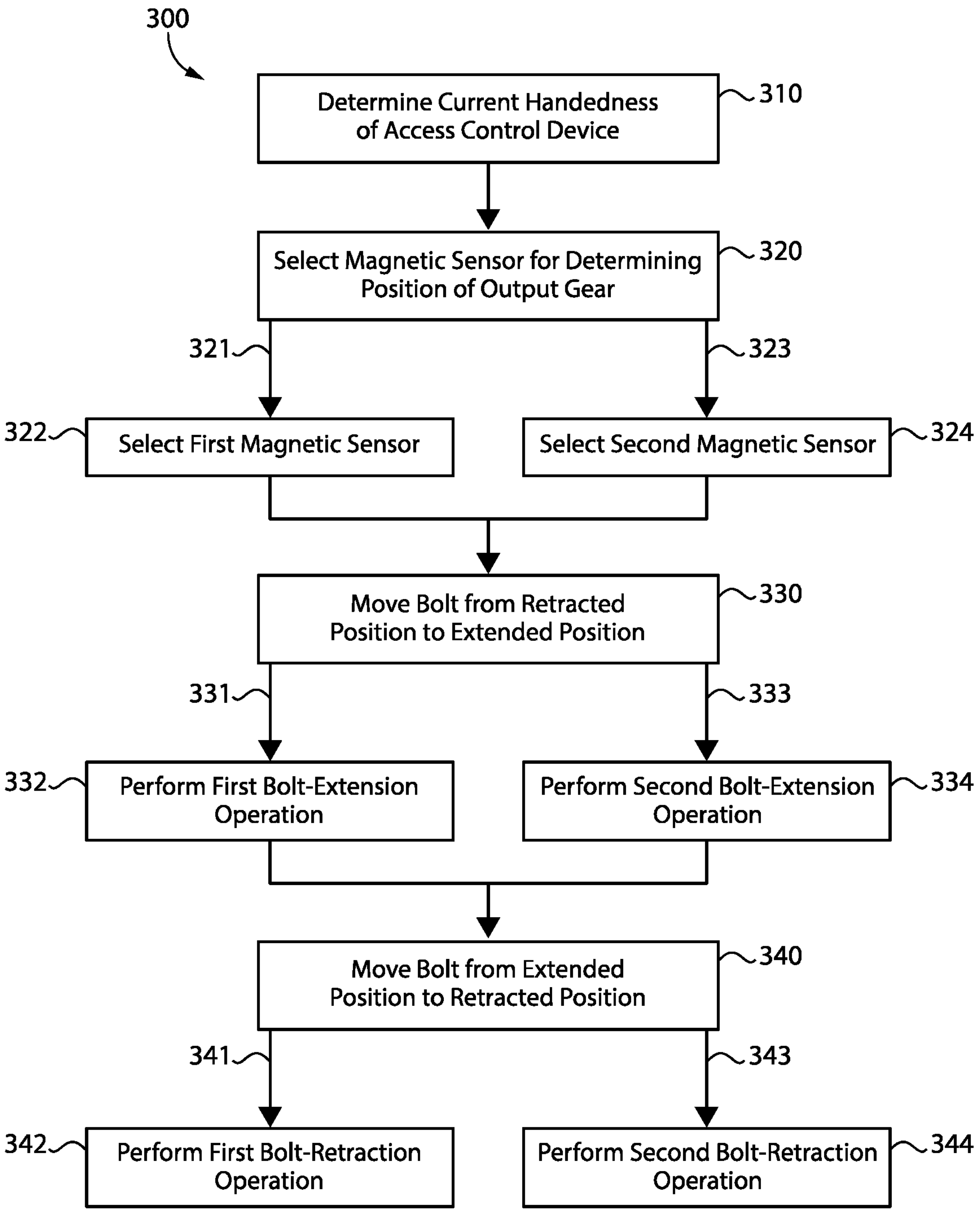
FIG. 19 is a schematic flow diagram of a process according to certain embodiments.

With additional reference to FIG. 19, an exemplary process 300 that may be performed using the lockset 100 is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 300 is described herein with specific reference to the lockset 100 illustrated in FIGS. 1-18, it is to be appreciated that the process 300 may be performed with access control devices having additional and/or alternative features.

The process 300 may begin with block 310, which generally involves determining a current handedness of the lockset 100. In certain forms, block 310 may involve determining the current handedness of the lockset 100 based upon information generated by a three-position switch, such as the triangle switch 148. For example, the installation instructions may direct the user to turn the thumbturn 128 in the appropriate direction to drive the bolt 134 from the retracted position to the extended position, thereby causing the triangle switch 148 to transmit to the controller 144 a signal indicating the current handedness of the lockset 100.

When the lockset 100 is in its unlocked state, the triangle switch 148 is in an unactuated state. When the user turns the thumbturn 128 in the counter-clockwise direction 294 to extend the bolt 134, the collar 124 actuates the triangle switch 148 to a first actuated state (FIG. 12), thereby causing the triangle switch 148 to transmit to the controller 144 a first handedness signal indicating that the lockset 100 has been installed in the first handing configuration. When the user turns the thumbturn 128 in the clockwise direction 292 to extend the bolt 134, the collar 124 actuates the triangle switch 148 to a second actuated state (FIG. 16), thereby causing the triangle switch 148 to transmit to the controller 144 a second handedness signal indicating that the lockset 100 has been installed in the second handing configuration. Regardless of the handing, the user may manually retract the bolt after moving the bolt to the extended position.

The process 300 may include block 320, which generally involves selecting a magnetic sensor for determining the position of the output gear. In certain embodiments, the selection of block 320 may be based upon the information generated by the three-position switch in block 310. For example, when the information generated by the triangle switch 148 indicates that the lockset 100 is in the first handing configuration, block 320 may involve the controller 144 proceeding along path 321 to block 322, which involves selecting the first magnetic sensor 146. Block 322 may further involve operating the motor 220 to move the output gear 250 to the first handedness first home position based upon information generated by the selected magnetic sensor 146. Conversely, when the information generated by the triangle switch 148 indicates that the lockset 100 is in the second handing configuration, block 320 may involve the controller 144 proceeding along path 323 to block 324, which involves selecting the second magnetic sensor 147. Block 324 may further involve operating the motor 220 to move the output gear 250 to the second handedness first home position based upon information generated by the selected magnetic sensor 147.

The process 300 may include block 330, which generally involves electronically moving the bolt 134 from the retracted position to the extended position. Block 330 may, for example, be performed in response to a locking condition, such as the depression of the relock key 115'. The moving of block 330 may be performed based upon the current handedness of the lockset 100 as determined in block 310 and/or using information generated by the magnetic sensor selected in block 320. For example, when the current handedness of the lockset 100 is the first handing configuration, the controller 144 may proceed along path 331 to block 332, which generally involves performing a first bolt-extension operation, such as the bolt-extension operation 410 illustrated in FIG. 20. Conversely, when the current handedness of the lockset 100 is the second handing configuration, the controller 144 may proceed along path 333 to block 334, which generally involves performing a second bolt-extension operation, such as the bolt-extension operation 420 illustrated in FIG. 21.

The process 300 may include block 340, which generally involves electronically moving the bolt 134 from the extended position to the retracted position. Block 340 may, for example, be performed in response to an unlocking condition, such as the entry of an authorized access code via the credential reader 114. The moving of block 340 may be performed based upon the current handedness of the lockset 100 as determined in block 310 and/or using information generated by the magnetic sensor selected in block 320. For example, when the current handedness of the lockset 100 is the first handing configuration, the controller 144 may proceed along path 341 to block 342, which generally involves performing a first bolt-retraction operation, such as the bolt-retraction operation 430 illustrated in FIG. 22. Conversely, when the current handedness of the lockset 100 is the second handing configuration, the controller 144 may proceed along path 343 to block 344, which generally involves performing a second bolt-retraction operation, such as the bolt-retraction operation 440 illustrated in FIG. 23.

Figure 20:
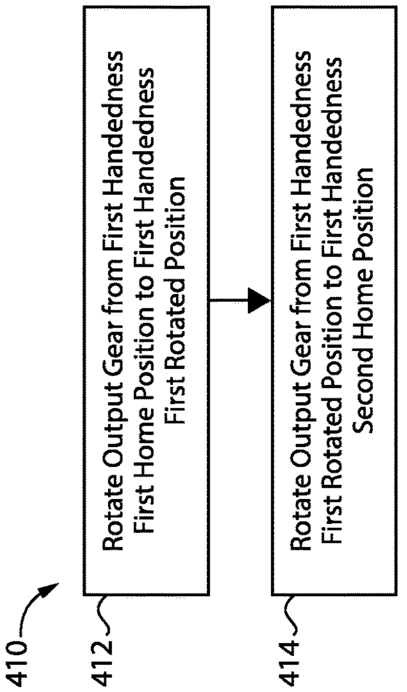
FIG. 20 is a schematic flow diagram of a first bolt-extension operation according to certain embodiments.

With additional reference to FIG. 20, illustrated therein is an example first bolt-extension operation 410. The first bolt-extension operation 410 may, for example, be performed in connection with the process 300 to satisfy block 332. The first bolt-extension operation 410 may begin with the lockset 100 in the first handedness first state illustrated in FIG. 11, in which the output member 240 is in its unlocking position and the output gear 250 is in the first handedness first home position.

The first bolt-extension operation 410 may include block 412, which generally involves the controller 144 operating the motor 220 to rotate the output gear 250 in the first handedness locking direction (e.g., the counter-clockwise direction 294) from the first handedness first home position (FIG. 11) to the first handedness first rotated position (FIG. 12). Block 412 may, for example, involve the controller 144 operating the motor 220 for a predetermined time and/or for a predetermined number of steps/pulses. As will be appreciated, block 412 causes rotation of the output member 240 from its unlocking position to its locking position (and thus extension of the bolt 134) as described above with reference to FIGS. 11 and 12.

The first bolt-extension operation 410 may include block 414, which generally involves the controller 144 operating the motor 220 to rotate the output gear 250 in the first handedness unlocking direction (e.g., the clockwise direction 292) from the first handedness first rotated position (FIG. 12) to the first handedness second home position (FIG. 13). Block 414 may, for example, involve the controller operating the motor 220 until information generated by the first magnetic sensor 146 indicates that the output gear 250 has reached the first handedness second home position. As noted above, the lost rotational motion connection 202 permits the output member 240 to remain in its locking position during such rotation of the output gear 250 from the first handedness first rotated position to the first handedness second home position. As such, the bolt 134 remains extended.

Figure 21:
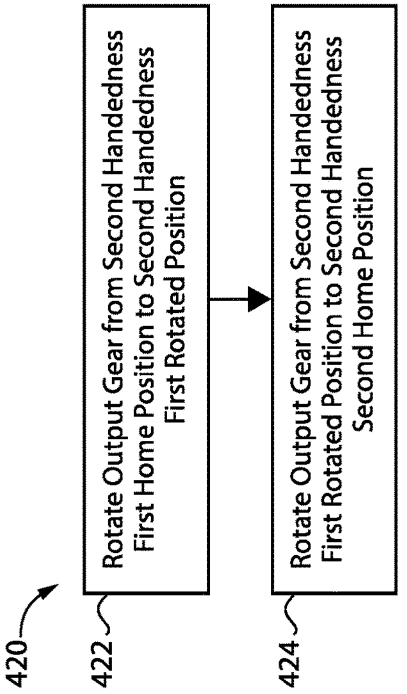
FIG. 21 is a schematic flow diagram of a second bolt-extension operation according to certain embodiments.

With additional reference to FIG. 21, illustrated therein is an example second bolt-extension operation 420. The second bolt-extension operation 420 may, for example, be performed in connection with the process 300 to satisfy block 334. The second bolt-extension operation 420 may begin with the lockset 100 in the second handedness first state illustrated in FIG. 15, in which the output member 240 is in its unlocking position and the output gear 250 is in the second handedness first home position.

The second bolt-extension operation 420 may include block 422, which generally involves the controller 144 operating the motor 220 to rotate the output gear 250 in the second handedness locking direction (e.g., the clockwise direction 292) from the second handedness first home position (FIG. 15) to the second handedness first rotated position (FIG. 16). Block 422 may, for example, involve the controller 144 operating the motor 220 for a predetermined time and/or for a predetermined number of steps/pulses. As will be appreciated, block 422 causes rotation of the output member 240 from its unlocking position to its locking position (and thus extension of the bolt 134) as described above with reference to FIGS. 15 and 16.

The second bolt-extension operation 420 may include block 424, which generally involves the controller 144 operating the motor 220 to rotate the output gear 250 in the second handedness unlocking direction (e.g., the counter-clockwise direction 294) from the second handedness first rotated position (FIG. 16) to the second handedness second home position (FIG. 17). Block 424 may, for example, involve the controller operating the motor 220 until information generated by the second magnetic sensor 147 indicates that the output gear 250 has reached the second handedness second home position. As noted above, the lost rotational motion connection 202 permits the output member 240 to remain in its locking position during such rotation of the output gear 250 from the second handedness first rotated position to the second handedness second home position. As such, the bolt 134 remains extended.

Figure 22:
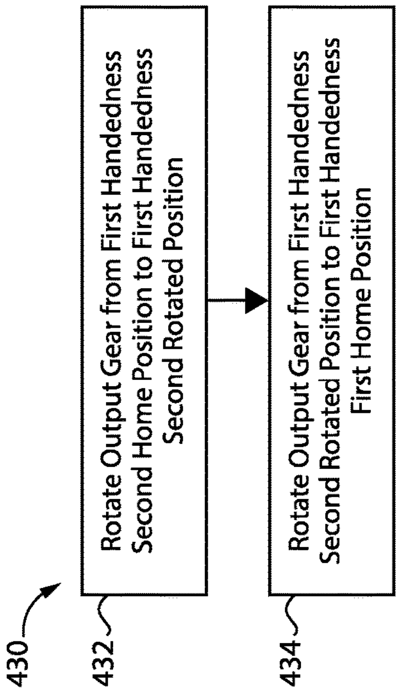
FIG. 22 is a schematic flow diagram of a first bolt-retraction operation according to certain embodiments.

With additional reference to FIG. 22, illustrated therein is an example first bolt-retraction operation 430. The first bolt-retraction operation 430 may, for example, be performed in connection with the process 300 to satisfy block 342. The first bolt-retraction operation 430 may begin with the lockset 100 in the first handedness third state illustrated in FIG. 13, in which the output member 240 is in its locking position and the output gear 250 is in the first handedness second home position.

The first bolt-retraction operation 430 may include block 432, which generally involves the controller 144 operating the motor 220 to rotate the output gear 250 in the first handedness unlocking direction (e.g., the clockwise direction 292) from the first handedness second home position (FIG. 13) to the first handedness second rotated position (FIG. 14). Block 432 may, for example, involve the controller 144 operating the motor 220 for a predetermined time and/or for a predetermined number of steps/pulses. As will be appreciated, block 432 causes rotation of the output member 240 from its locking position to its unlocking position (and thus retraction of the bolt 134) as described above with reference to FIGS. 13 and 14.

The first bolt-retraction operation 430 may include block 434, which generally involves the controller 144 operating the motor 220 to rotate the output gear 250 in the first handedness locking direction (e.g., the counter-clockwise direction 294) from the first handedness second rotated position (FIG. 14) to the first handedness first home position (FIG. 11). Block 434 may, for example, involve the controller 144 operating the motor 220 until information generated by the first magnetic sensor 146 indicates that the output gear 250 has reached the first handedness first home position. As noted above, the lost rotational motion connection 202 permits the output member 240 to remain in its unlocking position during such rotation of the output gear 250 from the first handedness second rotated position to the first handedness first home position. As such, the bolt 134 remains retracted.

Figure 23:
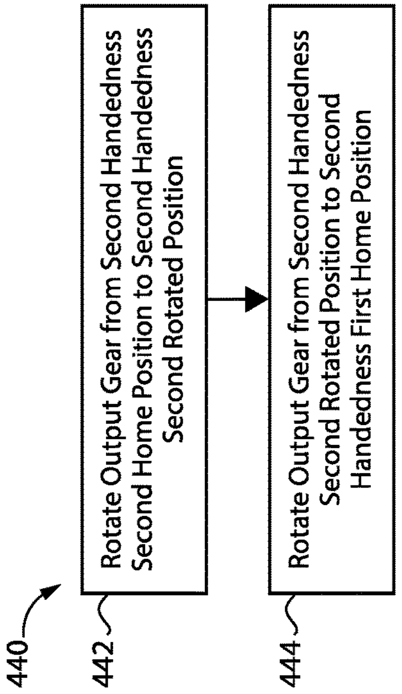
FIG. 23 is a schematic flow diagram of a second bolt-retraction operation according to certain embodiments.

With additional reference to FIG. 23, illustrated therein is an example second bolt-retraction operation 440. The second bolt-retraction operation 440 may, for example, be performed in connection with the process 300 to satisfy block 344. The second bolt-retraction operation 440 may begin with the lockset 100 in the second handedness third state illustrated in FIG. 17, in which the output member 240 is in its locking position and the output gear 250 is in the second handedness second home position.

The second bolt-retraction operation 440 may include block 442, which generally involves the controller 144 operating the motor 220 to rotate the output gear 250 in the second handedness unlocking direction (e.g., the counter-clockwise direction 294) from the second handedness second home position (FIG. 17) to the second handedness second rotated position (FIG. 18). Block 442 may, for example, involve the controller 144 operating the motor 220 for a predetermined time and/or for a predetermined number of steps/pulses. As will be appreciated, block 442 causes rotation of the output member 240 from its locking position to its unlocking position (and thus retraction of the bolt 134) as described above with reference to FIGS. 17 and 18.

The second bolt-retraction operation 440 may include block 444, which generally involves the controller 144 operating the motor 220 to rotate the output gear 250 in the second handedness locking direction (e.g., the clockwise direction 292) from the second handedness second rotated position (FIG. 18) to the second handedness first home position (FIG. 15). Block 442 may, for example, involve the controller 144 operating the motor 220 until information generated by the second magnetic sensor 147 indicates that the output gear 250 has reached the second handedness first home position. As noted above, the lost rotational motion connection 202 permits the output member 240 to remain in its unlocking position during such rotation of the output gear 250 from the second handedness second rotated position to the second handedness first home position. As such, the bolt 134 remains retracted.

Figure 24:
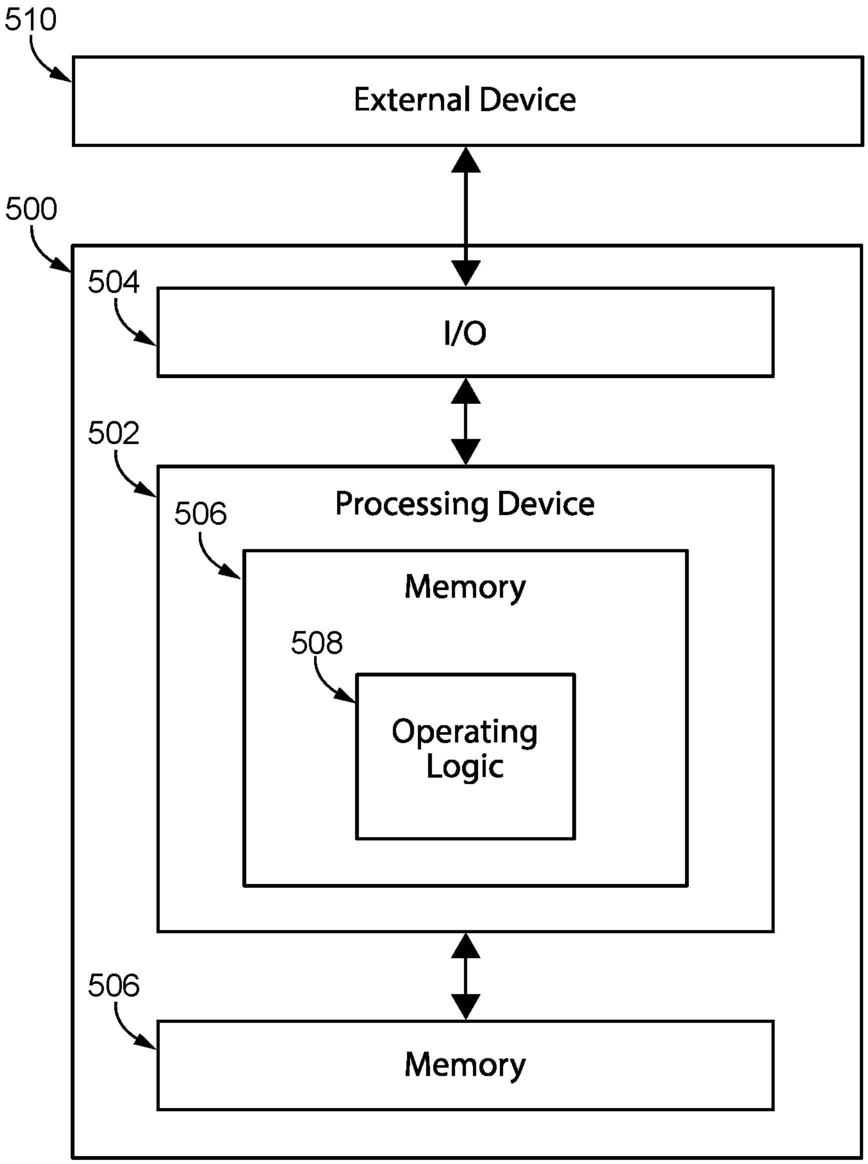
FIG. 24 is a schematic block diagram of a computing device that may be utilized in connection with certain embodiments.

Referring now to FIG. 24, a simplified block diagram of at least one embodiment of a computing device 500 is shown. The illustrative computing device 500 depicts at least one embodiment of a controller that may be utilized in connection with the controller 144 illustrated in FIGS. 4 and 6.

Depending on the particular embodiment, the computing device 500 may be embodied as a server, desktop computer, laptop computer, tablet computer, notebook, netbook, Ultrabook™ mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 500 includes a processing device 502 that executes algorithms and/or processes data in accordance with operating logic 508, an input/output device 504 that enables communication between the computing device 500 and one or more external devices 510, and memory 506 which stores, for example, data received from the external device 510 via the input/output device 504.

The input/output device 504 allows the computing device 500 to communicate with the external device 510. For example, the input/output device 504 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), WiMAX, etc.) to effect such communication depending on the particular computing device 500. The input/output device 504 may include hardware, software, and/or firmware suitable for performing the techniques described herein.

The external device 510 may be any type of device that allows data to be inputted or outputted from the computing device 500. For example, in various embodiments, the external device 510 may be embodied as the credential reader 114, the first magnetic sensor 146, the second magnetic sensor 147, the triangle switch 148, and/or the motor 220. Further, in some embodiments, the external device 510 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 510 may be integrated into the computing device 500.

The processing device 502 may be embodied as any type of processor(s) capable of performing the functions described herein. In particular, the processing device 502 may be embodied as one or more single or multi-core processors, microcontrollers, or other processor or processing/controlling circuits. For example, in some embodiments, the processing device 502 may include or be embodied as an arithmetic logic unit (ALU), central processing unit (CPU), digital signal processor (DSP), and/or another suitable processor(s). The processing device 502 may be a programmable type, a dedicated hardwired state machine, or a combination thereof. Processing devices 502 with multiple processing units may utilize distributed, pipelined, and/or parallel processing in various embodiments. Further, the processing device 502 may be dedicated to performance of just the operations described herein, or may be utilized in one or more additional applications. In the illustrative embodiment, the processing device 502 is of a programmable variety that executes algorithms and/or processes data in accordance with operating logic 508 as defined by programming instructions (such as software or firmware) stored in memory 506. Additionally or alternatively, the operating logic 508 for processing device 502 may be at least partially defined by hardwired logic or other hardware. Further, the processing device 502 may include one or more components of any type suitable to process the signals received from input/output device 504 or from other components or devices and to provide desired output signals. Such components may include digital circuitry, analog circuitry, or a combination thereof.

The memory 506 may be of one or more types of non-transitory computer-readable media, such as a solid-state memory, electromagnetic memory, optical memory, or a combination thereof. Furthermore, the memory 506 may be volatile and/or nonvolatile and, in some embodiments, some or all of the memory 506 may be of a portable variety, such as a disk, tape, memory stick, cartridge, and/or other suitable portable memory. In operation, the memory 506 may store various data and software used during operation of the computing device 500 such as operating systems, applications, programs, libraries, and drivers. It should be appreciated that the memory 506 may store data that is manipulated by the operating logic 508 of processing device 502, such as, for example, data representative of signals received from and/or sent to the input/output device 504 in addition to or in lieu of storing programming instructions defining operating logic 508. As illustrated, the memory 506 may be included with the processing device 502 and/or coupled to the processing device 502 depending on the particular embodiment. For example, in some embodiments, the processing device 502, the memory 506, and/or other components of the computing device 500 may form a portion of a system-on-a-chip (SoC) and be incorporated on a single integrated circuit chip.

In some embodiments, various components of the computing device 500 (e.g., the processing device 502 and the memory 506) may be communicatively coupled via an input/output subsystem, which may be embodied as circuitry and/or components to facilitate input/output operations with the processing device 502, the memory 506, and other components of the computing device 500. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 500 may include other or additional components, such as those commonly found in a typical computing device (e.g., various input/output devices and/or other components), in other embodiments. It should be further appreciated that one or more of the components of the computing device 500 described herein may be distributed across multiple computing devices. In other words, the techniques described herein may be employed by a computing system that includes one or more computing devices. Additionally, although only a single processing device 502, I/O device 504, and memory 506 are illustratively shown in FIG. 24, it should be appreciated that a particular computing device 500 may include multiple processing devices 502, I/O devices 504, and/or memories 506 in other embodiments. Further, in some embodiments, more than one external device 510 may be in communication with the computing device 500.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An access control device having a first handing configuration and a second handing configuration, the access control device comprising:

a bolt;

an output member operable to drive the bolt between a bolt first position and a bolt second position, wherein with the access control device in the first handing configuration, the output member has a first handedness first position corresponding to the bolt first position and a first handedness second position corresponding to the bolt second position, and wherein with the access control device in the second handing configuration, the output member has a second handedness first position corresponding to the bolt first position and a second handedness second position corresponding to the bolt second position;

an output gear operable to rotate the output member to thereby drive the bolt between the bolt first position and the bolt second position, the output gear comprising a magnet;

a motor operable to rotate the output gear;

a first magnetic sensor operable to detect the magnet when the output gear is in each of a first handedness first home position and a first handedness second home position different from the first handedness first home position;

a second magnetic sensor operable to detect the magnet when the output gear is in each of a second handedness first home position and a second handedness second home position different from the second handedness first home position; and a controller in communication with the motor, the first magnetic sensor, and the second magnetic sensor;

wherein, with the access control device in the first handing configuration, the controller is configured to perform a first handedness first operation in response to a first condition, and wherein the first handedness first operation comprises controlling the motor to cause a first handedness first rotational movement and thereafter controlling the motor to cause a first handedness second rotational movement;

wherein the first handedness first rotational movement comprises rotation of the output gear in a first rotational direction from the first handedness first home position to a first handedness first rotated position;

wherein the first handedness second rotational movement comprises rotation of the output gear in a second rotational direction from the first handedness first rotated position to the first handedness second home position;

wherein the first handedness first rotational movement drives the output member from the first handedness first position to the first handedness second position; and wherein the output member is configured to remain in the first handedness second position throughout the first handedness second rotational movement.

2. The access control device of claim 1, further comprising a three-position switch including an actuating arm;

wherein the output member is configured to hold the actuating arm in a first actuated position when the output member is in the first handedness second position and the access control device is in the first handing configuration; and wherein the output member is configured to hold the actuating arm in a second actuated position when the output member is in the second handedness second position and the access control device is in the second handing configuration.

3. The access control device of claim 1, wherein the controller is configured to:

determine when the output gear is in the first handedness first home position based upon information generated by the first magnetic sensor;

determine when the output gear is in the first handedness second home position based upon information generated by the first magnetic sensor;

determine when the output gear is in the second handedness first home position based upon information generated by the second magnetic sensor; and determine when the output gear is in the second handedness second home position based upon information generated by the second magnetic sensor.

4. The access control device of claim 1, further comprising a lost rotational motion connection between the output gear and the output member;

wherein, with the access control device in the first handing configuration, the lost rotational motion connection is configured to drive the output member from the first handedness first position to the first handedness second position during rotation of the output gear in a first rotational direction from the first handedness first home position to a first handedness first rotated position, and to permit the output member to remain in the first handedness second position during rotation of the output gear in a second rotational direction from the first handedness first rotated position to the first handedness second home position; and wherein, with the access control device in the second handing configuration, the lost rotational motion connection is further configured to drive the output member from the second handedness first position to the second handedness second position during rotation of the output gear in the second rotational direction from the second handedness first home position to a second handedness first rotated position, and to permit the output member to remain in the second handedness second position during rotation of the output gear in the first rotational direction from the second handedness first rotated position to the second handedness second home position.

5. The access control device of claim 1, wherein the first handedness first operation comprises ceasing the second rotational movement in response to detecting that the output gear is in the first handedness second home position based on information generated by the first magnetic sensor.

6. The access control device of claim 1, wherein, with the access control device in the second handing configuration, the controller is configured to perform a second handedness first operation in response to the first condition, wherein the second handedness first operation comprises controlling the motor to cause a third rotational movement and thereafter controlling the motor to cause a fourth rotational movement;

wherein the third rotational movement comprises rotation of the output gear in the second rotational direction from the second handedness first home position to a second handedness first rotated position;

wherein the fourth rotational movement comprises rotation of the output gear in the first rotational direction from the second handedness first rotated position to the second handedness second home position;

wherein the third rotational movement drives the output member from the second handedness first position to the second handedness second position; and wherein the output member is configured to remain in the second handedness second position throughout the fourth rotational movement.

7. The access control device of claim 6, wherein the second handedness first operation comprises ceasing the fourth rotational movement in response to detecting that the output gear is in the second handedness second home position based on information generated by the second magnetic sensor.

8. The access control device of claim 1, wherein the first handedness second rotational movement further comprises ceasing operation of the motor in response to information generated by the first magnetic sensor indicating that the output gear has reached the first handedness second home position.

9. The access control device of claim 1, wherein, with the access control device in the second handing configuration, the controller is configured to perform a second handedness first operation in response to the first condition, and wherein the second handedness first operation comprises controlling the motor to cause a second handedness first rotational movement and thereafter controlling the motor to cause a second handedness second rotational movement;

wherein the second handedness first rotational movement comprises rotation of the output gear in the second rotational direction from the second handedness first home position to a second handedness first rotated position;

wherein the second handedness second rotational movement comprises rotation of the output gear in the first rotational direction from the second handedness first rotated position to the second handedness second home position;

wherein the second handedness first rotational movement drives the output member from the second handedness first position to the second handedness second position; and wherein the output member is configured to remain in the second handedness second position throughout the second handedness second rotational movement.

10. A method of operating an access control device comprising a bolt, an output gear having a magnet mounted thereon, a first magnetic sensor, and a second magnetic sensor, the method comprising:

selectively determining a position of the output gear via one of the first magnetic sensor or the second magnetic sensor based upon a current handedness of the access control device, comprising:

with the access control device in a first handing configuration, detecting a first handedness first home position of the output gear in response to actuation of the first magnetic sensor by the magnet; and with the access control device in a second handing configuration, detecting a second handedness first home position of the output gear in response to actuation of the second magnetic sensor by the magnet; and performing a first operation in response to a first condition;

wherein, with the access control device in the first handing configuration, performing the first operation comprises rotating the output gear in a first rotational direction from the first handedness first home position to a first rotated position to thereby cause movement of the bolt from a bolt first position to a bolt second position, and thereafter rotating the output gear in a second rotational direction from the first rotated position to a first handedness second home position while the bolt remains in the bolt second position;

wherein, with the access control device in the second handing configuration, performing the first operation comprises rotating the output gear in the second rotational direction from the second handedness first home position to a second rotated position to thereby cause movement of the bolt from the bolt first position to the bolt second position, and thereafter rotating the output gear in the first rotational direction from the second rotated position to a second handedness second home position while the bolt remains in the bolt second position;

wherein the first handedness first home position and the first handedness second home position are rotationally offset from one another; and wherein the second handedness first home position and the second handedness second home position are rotationally offset from one another.

11. The method of claim 10, further comprising determining the current handedness of the access control device based upon information generated by a three-position switch.

12. The method of claim 11, wherein the three-position switch has a first state when the bolt is in the bolt first position;

wherein the three-position switch has a second state when the access control device is in the first handing configuration and the bolt is in the bolt second position; and wherein the three-position switch has a third state when the access control device is in the second handing configuration and the bolt is in the bolt second position.

13. The method of claim 10, further comprising moving the bolt from the bolt first position to the bolt second position in response to the first condition;

wherein rotating the output gear in the second rotational direction from the first rotated position to the first handedness second home position comprises rotating the output gear in the second rotational direction until information generated by the first magnetic sensor indicates that the output gear has reached the first handedness second home position; and rotating the output gear in the first rotational direction from the second rotated position to the second handedness second home position comprises rotating the output gear in the first rotational direction until information generated by the second magnetic sensor indicates that the output gear has reached the second handedness second home position.

14. An access control device having a first handing configuration, a second handing configuration, an unlocked state, and a locked state, the access control device comprising:

an output member operable to transition the access control device between the unlocked state and the locked state, wherein for each of the first handing configuration and the second handing configuration, the output member has a corresponding unlocking position and a corresponding locking position;

an output gear operable to rotate the output member to thereby move the access control device between the unlocked state and the locked state, the output gear comprising a magnet, wherein for each of the first handing configuration and the second handing configuration, the output gear has a corresponding first home position and a corresponding second home position, and wherein for each of the first handing configuration and the second handing configuration, the corresponding first home position is angularly offset from the corresponding second home position;

a plurality of magnetic sensors, each operable to detect the first home position and the second home position for a corresponding one of the first handing configuration and the second handing configuration, wherein the plurality of magnetic sensors comprises a first magnetic sensor and a second magnetic sensor, a motor operable to rotate the output gear; and a controller in communication with the motor, the first magnetic sensor, and the second magnetic sensor, wherein the controller is configured to perform an unlocking operation corresponding to a current handing configuration of the access control device in response to an unlock condition;

wherein for each of the first handing configuration and the second handing configuration, the unlocking operation comprises:

controlling the motor to cause a first unlocking movement corresponding to the current handing configuration, wherein the first unlocking movement comprises rotation of the output gear in a corresponding unlocking direction to thereby move the output member to the corresponding unlocking position; and controlling the motor to perform a second unlocking movement corresponding to the current handing configuration, wherein the second unlocking movement comprises rotation of the output gear in a corresponding locking direction;

wherein the controller is configured to cease the second unlocking movement in response to information generated by the corresponding magnetic sensor indicating that the output gear has reached the corresponding first home position; and wherein the output member is configured to remain in the corresponding unlocking position throughout the second unlocking movement.

15. The access control device of claim 14, wherein the controller is further configured to perform a locking operation corresponding to the current handing configuration of the access control device in response to a lock condition; and wherein for each of the first handing configuration and the second handing configuration, the locking operation comprises:

controlling the motor to cause a first locking movement corresponding to the current handing configuration, wherein the first locking movement comprises rotation of the output gear in the corresponding locking direction to thereby drive the output member to the corresponding locking position; and controlling the motor to perform a second locking movement corresponding to the current handing configuration, wherein the second locking movement comprises rotation of the output gear in the corresponding unlocking direction;

wherein the controller is configured to cease the second locking movement in response to information generated by the corresponding magnetic sensor indicating that the output gear has reached the corresponding second home position; and wherein the output member is configured to remain in the corresponding locking position throughout the second locking movement.

16. The access control device of claim 15, wherein the lock condition comprises depression of a relock key of the access control device.

17. The access control device of claim 14, wherein the controller is further configured to determine the current handing configuration based on information generated by a three-position switch.

* * * * *